United States Patent [19]
Yamada

[11] Patent Number: 4,847,662
[45] Date of Patent: Jul. 11, 1989

[54] IMAGE FORMING APPARATUS

[75] Inventor: Masanori Yamada, Kawasaki, Japan

[73] Assignee: Canon Kabushiki Kaisha, Tokyo, Japan

[21] Appl. No.: 120,818

[22] Filed: Nov. 13, 1987

[30] Foreign Application Priority Data

Nov. 17, 1986 [JP] Japan ................................ 61-272002

[51] Int. Cl.$^4$ ................................................ G03B 27/52
[52] U.S. Cl. .......................................... 355/55; 355/56
[58] Field of Search ...................................... 355/55, 56

[56] References Cited

U.S. PATENT DOCUMENTS

| | | | |
|---|---|---|---|
| 4,597,663 | 7/1986 | Yoshiura et al. | 355/55 |
| 4,615,611 | 10/1986 | Yoshiura | 355/55 |
| 4,647,188 | 3/1987 | Komiya et al. | 355/55 |
| 4,647,189 | 3/1987 | Fujiwara et al. | 355/55 |
| 4,669,858 | 6/1987 | Ito et al. | 355/55 |
| 4,714,944 | 12/1987 | Yoshiura | 355/55 |

*Primary Examiner*—Monroe H. Hayes
*Attorney, Agent, or Firm*—Fitzpatrick, Cella, Harper & Scinto

[57] ABSTRACT

An image forming apparatus includes an original size input section for inputting an original size, a sheet size input section for inputting a sheet size, a variable magnification input section for inputting an arbitrary variable magnification, a selection section for selecting a variable magnification determination mode on the basis of a size relationship between the original size and the sheet size, a first display section for displaying the variable magnification input by the variable magnification input section, a second display section for preforming a mode display indicating that the variable magnification determination mode is selected, and a control section for controlling the first and second display sections. In this apparatus, the control section can simultaneously execute the display of the input variable magnification by the first display section and the mode display be the second display section.

9 Claims, 21 Drawing Sheets

RADR1
WADR
RADR2
X1
X0
X2
X3
0

VIDEO ENABLE
VIDEO OUTPUT FROM SHIFT MEMORY 303
EFFECTIVE IMAGE AREA
VIDEO OUTPUT FROM READER UNIT A

VIDEO ENABLE
VIDEO OUTPUT FROM SHIFT MEMORY
EFFECTIVE IMAGE AREA
VIDEO OUTPUT FROM READER UNIT A

FIG. 12

| FUNCTION NO. OF VARIABLE MAGNIFICATION | DISPLAY 126 (MX) | DISPLAY 125 (MY) |
|---|---|---|
| 1. EQUAL SIZE | 100 | 100 |
| 2. ZOOM | 369 | 369 |
| 3. XY ZOOM | 35 | 400 |
| 4. AUTO | A | A |
| 5. XY AUTO | 1 A | - - A |
| 6. X ZOOM Y AUTO | 35 | - - A |
| 7. X AUTO Y ZOOM | 1 A | 400 |

IMAGE FORMING APPARATUS

BACKGROUND OF THE INVENTION

1. Field of the Invention

The present invention relates to an image forming apparatus for forming a variable magnification image.

2. Related Background Art

In conventional copying machines of this type, magnifications can be automatically set in two directions (main scan and sub-scan directions of a read operation) or magnifications can be arbitrarily set by an operator in the two directions.

However, in the conventional copying machine, even if an operator wants to set a magnification in only one direction and does not particularly pay attention to a magnification in the other direction, the other magnification designation is requested, resulting in a cumbersome operation.

The apparatus which can automatically set the magnifications and the apparatus which can independently set magnifications in both main scan and sub-scan directions described above are disclosed in U.S. Pat. No. 4,505,579 (Canon), U.S. Pat. No. 4,647,188 (Canon), U.S. Pat. No. 4,366,508 (Xerox), and the like. However, demand has arisen for developing an apparatus having still high operability.

SUMMARY OF THE INVENTION

It is an object of the present invention to eliminate the conventional drawbacks.

It is another object of the present invention to improve an image forming apparatus comprising a variable magnification function.

It is still another object of the present invention to provide an image forming apparatus having a good operability.

It is still another object of the present invention to provide an image forming apparatus having a variety of functions.

The above and other objects will be apparent from the following description of the preferred embodiments and the appended claims taken in conjunction with the accompanying drawings.

BRIEF DESCRIPTION OF THE DRAWINGS

FIG. 12 is a view for explaining the correspondence between variable magnification functions and display contents according to this embodiment;

DETAILED DESCRIPTION OF THE PREFERRED EMBODIMENTS

An embodiment of the present invention will be described in detail with reference to the accompanying drawings.

(1) Outline of the Embodiment

Figure 1:
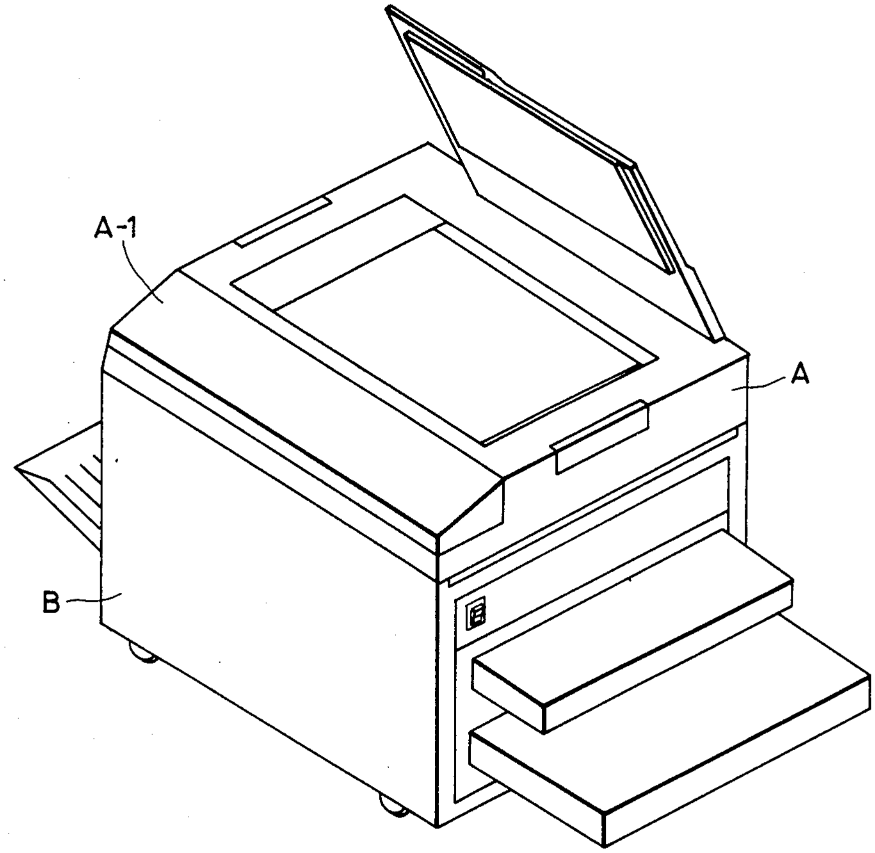
FIGS. 1, 2A, and 2B are respectively a perspective view and a sectional view showing an embodiment of a copying machine to which the present invention can be applied, and a plan view showing an arrangement of a console unit of the copying machine.
Figure 2A:
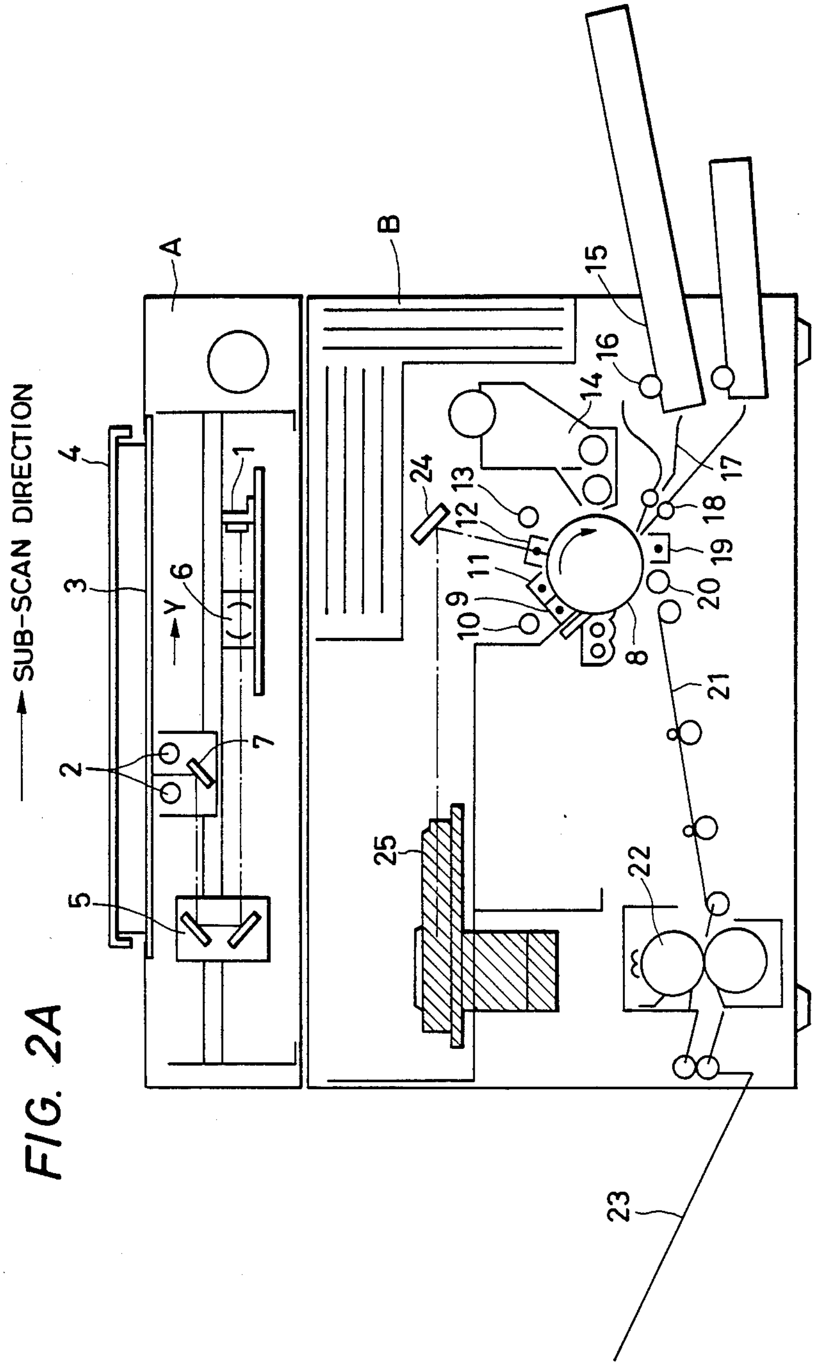

FIGS. 1 and 2A are respectively a perspective view and a sectional view of a copying machine to which the present invention can be applied.

The copying machine of this embodiment comprises a reader unit A for reading an original image, and a printer unit B for forming the read image on a recording medium such as a paper sheet, as shown in FIG. 1. The reader unit A has a console unit A-1 which will be described with reference to FIG. 2B.

As shown in FIG. 2A, an original document is placed on a document table glass 3 while a surface on which an image to be read is formed (original surface) faces down, and is pressed against the glass 3 by an original cover 4. The original surface is illuminated with a fluorescent lamp 2, and light reflected by the original surface is focused on the surface of a CCD (charge coupled device) 1 as a read sensor through mirrors 5 and 7 and a lens 6.

The mirrors 7 and 5 are moved in a sub-scan direction (indicated by an arrow Y) at a relative speed of 2:1. If a DC servo motor is adopted as a drive source, PLL (phase locked loop) control is performed to move the optical system at a constant speed. The moving speed is set to be 180 mm/sec in a forward direction (from the left to the right in FIG. 2A) in an equal magnification read mode, and is set to be 800 mm/sec in a backward direction (from the right to the left) regardless of a magnification.

Assuming that the maximum original size to be processed corresponds to an A3 size, and a resolution is 400 dots/inch, the CCD 1 requires the number of bits of 4678 $(=(297/25.4)\times400)$. In this embodiment, the CCD 1 having elements corresponding to 5,000 bits is used. A main scan period is set to be 352.7 $\mu$ sec $(=(10^6/180)\times(25.4/400))$.

Image signals which are serially processed by the reader unit A in units of bits of the CCD 1 are input to a laser scan optical system unit 25 of the printer unit B. The unit 25 comprises a semiconductor laser unit, a collimator lens, a rotational polygonal mirror, an F-$\theta$ lens, a correction optical system, and the like. More specifically, the image signals from the reader unit A supplied to the laser unit to be electrooptically converted, and the converted beam is radiated on the polygonal mirror which is rotated at high speed. Light reflected by the polygonal mirror is incident and scanned on a photosensitive body or photoreceptor 8.

A pre-discharger 9, pre-discharging lamp 10, a primary charger 11, a secondary charger 12, an overall exposure lamp 13, a developer 14, a paper feed cassette 15, a paper feed roller 16, a paper guide 17, registration rollers 18, a transfer charger 19, a separation roller 20, a convey guide 21, a fixing device 22, a tray 23, and the like are arranged with respect to the photosensitive body 8 as process components allowing image formation. The moving speed of the photosensitive body 8 and the convey system is 180 mm/sec. In this embodiment, the printer unit B employs a so-called laser beam printer but may employ various other printers, e.g., an ink-jet printer, a thermal printer, and the like.

The copying machine of this embodiment has intelligent functions such as image edit functions, e.g., a changing function capable of arbitrarily changing a magnification within the range of 35% to 400% at 1% interval, a trimming function for trimming a image of only a designated area, a shift function for shifting a trimmed image to a desired position on a recording medium, a coordinate position detection function of an original placed on the glass 3, and the like. These functions will be described later in detail.

Figure 2B:
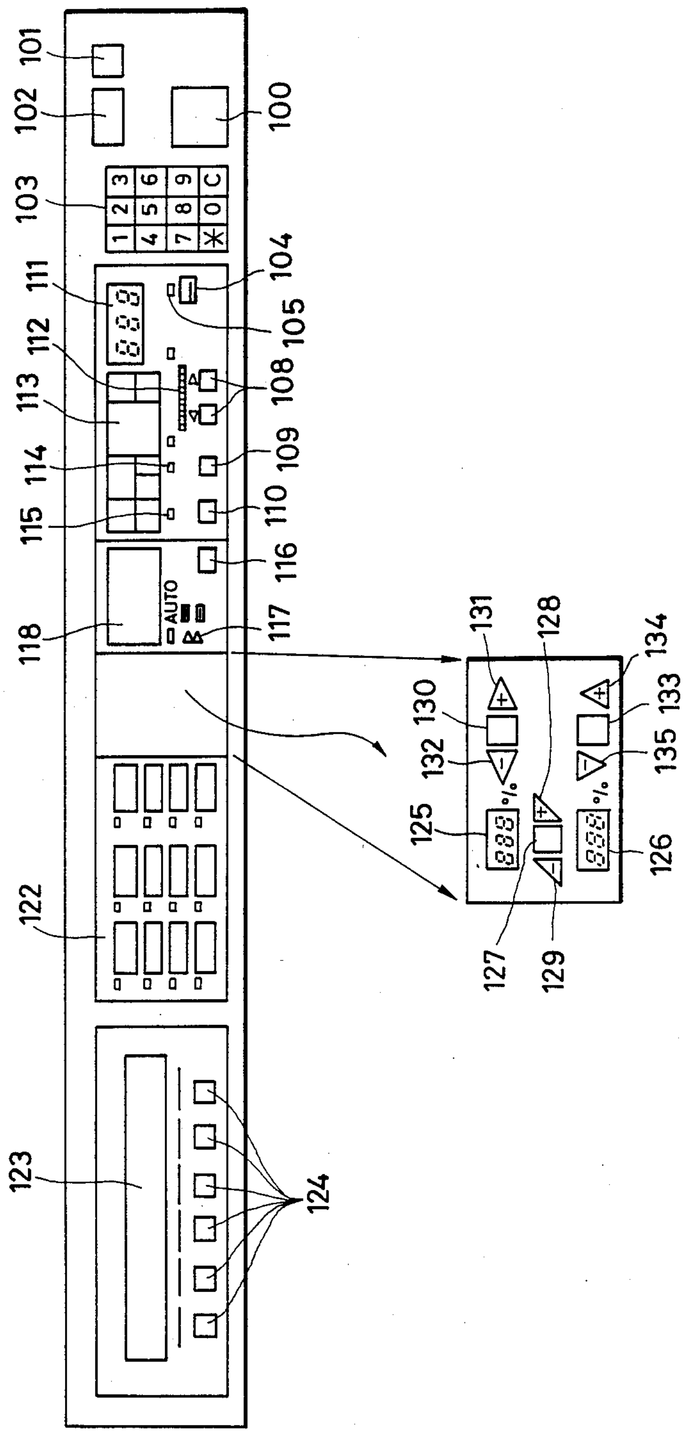

FIG. 2B shows an arrangement of the console unit A-1.

The console unit A-1 includes a copy start key 100 for instructing start of copying operation, a copy stop key 102 for instructing stop of a copying operation, a reset key 101 for resetting a copying mode to be a standard mode, and setting keys 103 including ten keys "0" to "9", a "c" key for clearing a set number of copies, and a "*" key used for inputting numerical data such as a trimming area. The unit A-1 also includes a density key 108 for setting a density, and a display 112 for displaying the input density. The unit A-1 further includes a key 104 for enabling/disabling the original coordinate position detection function and an indicator 105 therefor, a copy number display 111, a display 113 for displaying various error messages, a key 109 for enabling-/disabling an auto density adjusting function and an indicator 114 therefor, a key 110 for enabling/disabling a dither process function when a halftone image such as a photograph is read and an indicator 115 therefor, a key 116 for selecting a paper feed cassette or an auto paper size selecting function, an indicator 117 for indicating a selected cassette, and an indicator 118 for indicating a selected paper size.

An operation display 122 has preset keys for presetting or calling a copying mode, and indicators therefor. A liquid crystal display 123 has 32 digits of $5\times7$ dot matrixes. A soft key 124 is adopted to select a desired mode from a copying mode displayed in the display 123.

Displays 125 and 126 respectively display a magnification (or scale factor) MY in the sub-scan direction and a magnification MX in the main scan direction in units of %. Each time an equal magnification/variable magnification switch key 127 is depressed, the main scan and sub-scan magnifications MX and MY are alternately and repeatedly set in an equal magnification mode (or real size mode) (100%) and an auto magnification mode (MX =MY). Keys 128 and 129 are adopted to increment or decrement the magnifications MX and MY by 1% at the same time.

A switch key 130 is adopted to switch the 100% mode and the auto magnification mode of only the subscan magnification MY, and command keys 131 and 132 are adopted to increment or decrement only the magnification MY by 1%. A switch key 133 is adopted to switch the 100% mode and the auto magnification mode of only the main scan magnification MX, and command keys 134 and 135 are adopted to increment or decrement only the magnification MX by 1%. Note that the sub-scan direction corresponds to the moving direction Y of the mirrors 5 and 7, and the like, as described above, and the main scan direction is a direction perpendicular to the sub-scan direction.

Seven variable magnification functions can be set by selectively using the nine keys 127 to 129, 130 to 132, and 133 to 135 as will be described with reference to FIG. 13.

(2) Reader Unit

Figure 3:
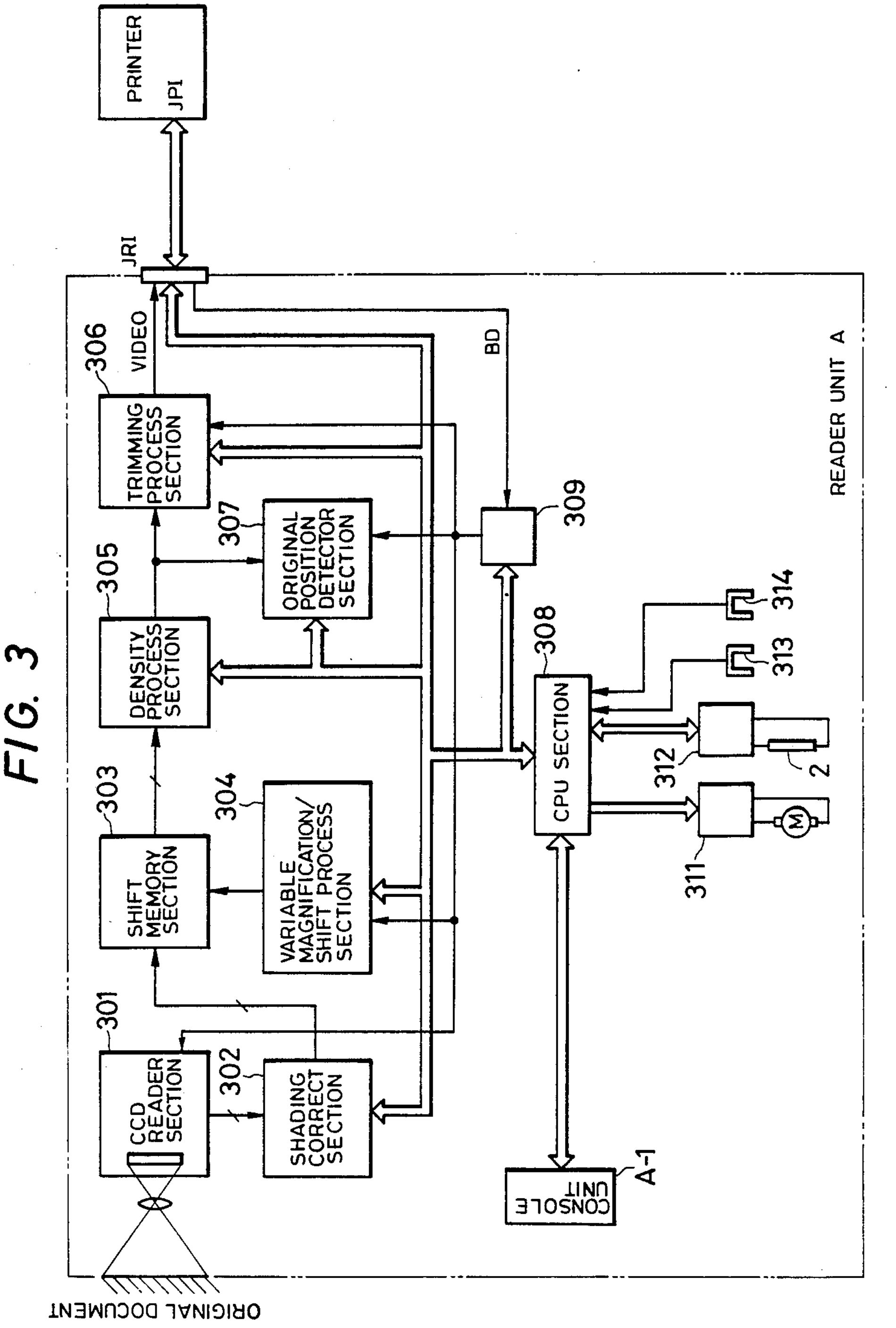
FIG. 3 is a block diagram showing an arrangement of a reader unit A in FIG. 1.

FIG. 3 shows a system arrangement of the reader unit A.

A CCD reader section 301 includes the CCD 1 described above, a clock driver for the CCD 1, an amplifier for amplifying signals from the CCD 1, a A/D converter for A/D converting the amplified signals, and the like. The CCD reader section 301 outputs image data which is converted into a 6-bit digital signal, and the image data is input to a shading correct section 302.

The shading correct section 302 detects a shading amount of the optical system such as a light source, a lens, and the like, and corrects the image data accordingly. Thereafter, the section 302 supplies the corrected image data to a shift memory section 303. The image data is temporarily stored in the memory section 303. Two line shift memories are provided to the shift memory section 303. When image data of an Nth line is written in a first shift memory, image data of an $(N-1)$th line is read out from a second shift memory. The shift memory section 303 also includes a write address counter for writing the image data in the respective shift memories, a read address counter for reading the image data, and an address selector for switching address signals from the counters. The shift memory section 303 will be described later in detail with reference to FIG. 5.

A variable magnification/shift process section 304 varies and sets a clock for defining a write period of the image signal to the shift memory, a clock for defining a read period of the image signal from the shift memory, and a read timing, thereby controlling the variable magnifications and shift processing in the main scan direction. This will also be described later in detail.

The image signal output from the shift memory section 303 is input to a density process section 305, and is subjected to binary or dither processing and converted to a binary signal. The binary signal is output to a trimming process unit 306. The trimming process section 306 forcibly sets an arbitrary section of image data for one line in the main scan direction to be "0" or "1", thereby allowing image edit processing. This will also be described later in detail. The binary signal output from the density process section 305 is input to an original position detector section 307. The detector section 307 detects a coordinate position of an original document on the glass 3 using the binary signal, as will be described later.

A CPU section 308 comprises a CPU for controlling the respective sections in accordance with the processing sequence, which will be described with reference to FIGS. 14 and 15A to 15D, a ROM storing the processing sequence, a working RAM, a timer circuit, an I/O interface, and the like. The CPU section 308 is connected to the console unit A-1, and controls the reader unit A in accordance with data set by an operator and also controls the printer unit B by serial communication.

A driver 311 for a DC servo motor M as a drive source for moving the optical system receives preset speed data from the CPU section 308 in accordance with an input magnification. A driver 312 for the fluorescent lamp 2 controls ON/OFF operation and an amount of light of the fluorescent lamp 2 under the control of the CPU section 308. Position sensors 313 and 314 are arranged at proper positions so as to inform the position of the optical system to the CPU section 308.

The reader unit A is connected to the printer unit B through a connector JR1 and a connector JP1 of the printer unit B. Control signals necessary for image data communication or serial communication are exchanged between the reader unit A and the printer unit B, as will be described later in detail with reference to FIGS. 10 and 11. Note that a horizontal sync signal BD is supplied from the printer unit B through the connector JR1, and is input to a clock generator 309. The clock generator 309 generates a transfer clock of a CCD signal or a reading/writing clock for the shift memory section 303 in synchronism with the horizontal sync signal BD.

(3) Original Position Detector Section

Figure 4:
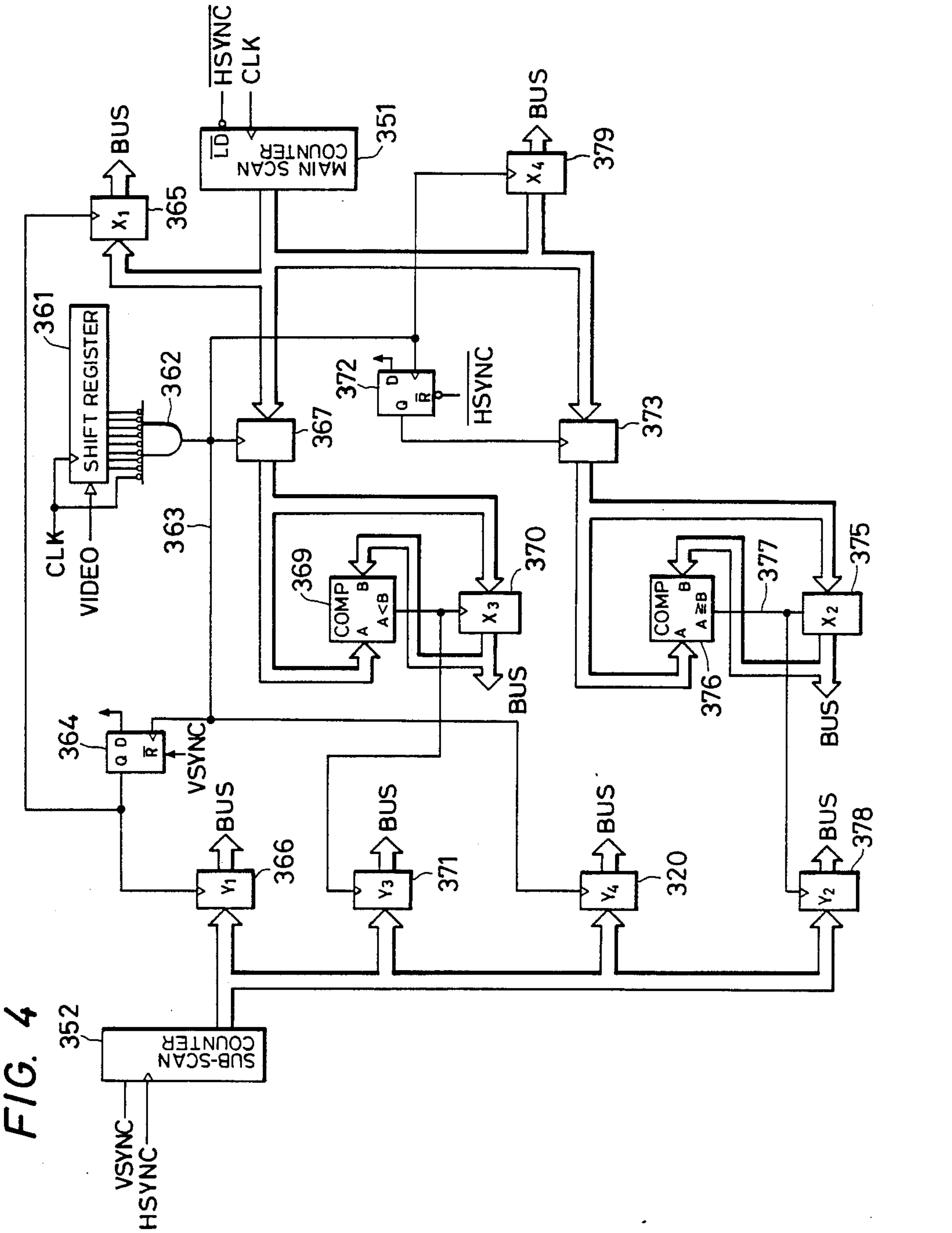
FIG. 4 is a circuit diagram showing a detailed arrangement of an original position detector section shown in FIG. 3.

FIG. 4 shows an arrangement of the original position detector section 307. A main scan counter 351 is adopted to indicate a main scan position in one main scan line. The counter 351 can serve as a down counter which is set to have a maximum value in the main scan direction (X direction) in response to a horizontal sync signal HSYNC and decremented each time an image data clock CLK is input. A sub-scan counter 352 indicates a scan position in the sub-scan direction. The counter 352 can serve as an up counter which is reset to be "0" in response to the leading edge of a vertical sync signal (image leading end signal) and incremented in response to the HSYNC signal.

During a pre-scan mode for determining a read level and detecting an original position prior to a read operation of an original image, binary image data VIDEO is input to a shift register 361 in units of, e.g., 8 bits. Upon completion of the 8-bit input, a gate circuit 362 determines whether or not all the 8-bit data is a white image. If an affirmative result is obtained, the gate circuit 362 outputs data "1" onto a signal line 363. More specifically, after the prescan operation of the original is started, if the 8-bit data which indicates a white image appears first, a flip-flop (F/F) 364 is set. The F/F 364 is reset in advance by the VSYNC signal, and maintains a set state until the next VSYNC signal is supplied.

When the F/F 364 is set, a value of the main scan counter 351 is loaded on an F/F 365 serving as a latch. This value is given as an $X_1$-coordinate. Meanwhile, a value of the sub-scan counter 352 at that time is loaded on a latch 366, and is given as a $Y_1$-coordinate. Therefore, one vertex $P_1$ ($X_1$, $Y_1$) of an original image can be obtained.

Each time data "1" appears on the signal line 363, the value from the main scan counter 351 is loaded on a latch 367. When the value from the main scan counter is loaded on the latch 367 while the 8-bit data indicating a white image first appears, the value from the main scan counter is compared with data in a latch 370 (which is set to be a maximum value in the X direction upon reception of the VSYNC signal) by a comparator 369. If the data in the latch 367 is smaller, the data from the latch 367 is loaded on a latch 370. Meanwhile, the value of the sub-scan counter 352 at that time is loaded on a latch 371. This operation is performed until the next 8-bit data is input to the shift register 361. In this manner, when the data in the latches 367 and 370 are compared with each other for the overall image area, a maximum value in the X direction of the original area is finally retained in the latch 370, and a Y-coordinate is retained in the latch 371. Since the main scan counter 351 is the down counter, a coordinate corresponding to the minimum value in the X direction represents a largest coordinate from an origin $S_P$ of the scan start position in the main scan direction. These coordinates are given by $P_3$ ($X_3$, $Y_3$)

An F/F 372 is set when the 8-bit data indicating a white image appears for each main scan line. The F/F 372 is reset in response to the horizontal sync signal HSYNC, and is set in response to the first 8-bit data indicating the white image. The F/F 372 retains this state until the next HSYNC signal is input. When the F/F 372 is set, a value of the main scan counter corresponding to a position of a first white signal appearing in one line is set in a latch 373. The value set in the latch 373 is compared with data in latch 375 by a comparator 376. A minimum value "0" in the X direction is set in the latch 375 at a generation timing of the VSYNC signal.

If the data in the latch 375 is equal to or smaller than the data in the latch 373, a signal 377 is set at an active level, and the data in the latch 373 is loaded on the latch 375. This operation is performed within a supply period of the HSYNC signal. When the above comparison operation is performed for the overall image area, a maximum value in the X direction of the original coordinate, i.e., an X-coordinate of a white signal of a point closest to the scan start point in the main scan direction, is retained in the latch 375. This value is given as $X_2$. When the signal 377 is output, the value of the sub-scan counter 352 is loaded on a latch 378. This value is given as $Y_2$, thus obtaining coordinates $P_2$ ($X_2$, $Y_2$)

Each time 8-bit data indicating a white image appears in the overall image area, values of the main scan and sub-scan counters at that time are respectively loaded on the latches 379 and 320.

Therefore, upon completion of the pre-scan operation of the original, count values when the 8-bit data indicating a white image finally appears are retained in the counters. These values are given by $P_4$ ($X_4$, $Y_4$)

The data lines of the above eight latches (366, 371, 320, 378, 365, 370, 375, and 379) are connected to a bus line BUS of the CPU section 308 shown in FIG. 3, and the CPU section 308 fetches the data retained in these latches upon completion of the pre-scan operation.

(4) Shift Memory Section

Figure 5:
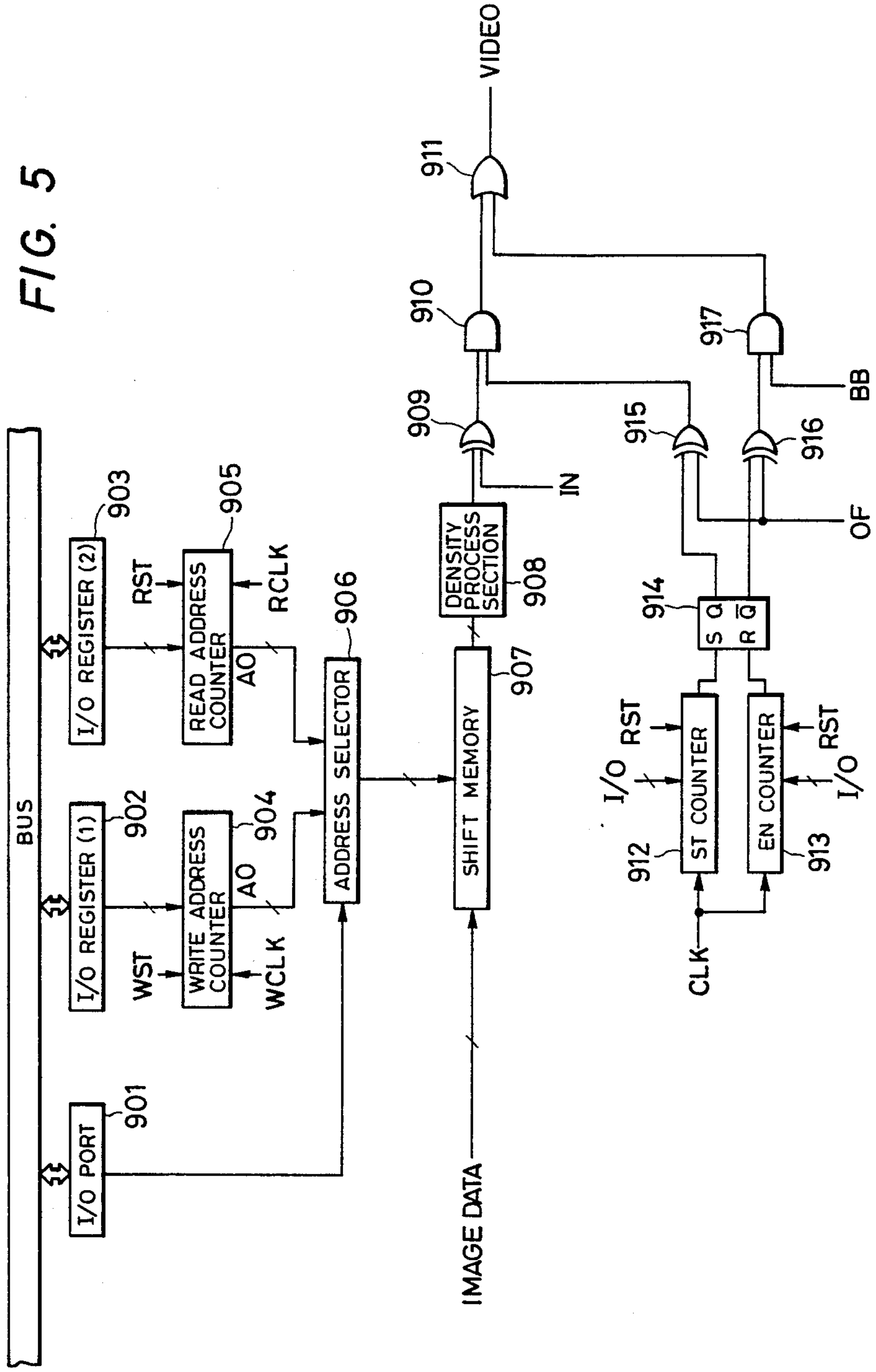
FIG. 5 is a circuit diagram showing an arrangement of a shift memory section, a density process section, and a trimming process section shown in FIG. 3.

FIG. 5 shows the arrangement of the shift memory section 303, the density process section 305, and the trimming process section 306 shown in FIG. 3. As described above, in this embodiment, the two line shift memories are arranged, so that the read and write operations are independently performed, thereby achieving high efficient processing. FIG. 5 illustrates only a system associated with one shift memory (indicated by 907) for the sake of simplicity.

A write address counter 904 serves as an address counter for writing data in the shift memory 907, and a read address counter 905 serves as an address counter for reading data from the shift memory 907. An address selector 906 receives a command from the CPU section 308 through an I/O port 901, and selects one of the address signals from the write address counter 904 and read address counters 905, thereby addressing the shift memory 907.

I/O registers 902 and 903 are controlled by the CPU section 308 so as to respectively supply preset values to the write and read address counters 904 and 905.

In this embodiment, both the read and write address counters 904 and 905 adopt down counters. The counters 904 and 905 receive count start signals WST and RST, respectively and also respectively receive a writing clock WCLK to the shift memory 907 and a reading clock RCLK from the shift memory.

Exclusive OR gates 915 and 916 determine an image area and are controlled by a signal OF. When the signal OF is at "1" level, the exclusive OR gates 915 and 916 mask an image inside a frame determined by an ST counter 912 and an EN counter 913 to output an image outside the frame. When the signal OF is at "0" level, the OR gates 915 and 916 mask an image outside the frame to output an intra-frame image.

An AND gate 910 output-controls image data which is output from the shift memory 907 and is converted to a binary signal via a density process section 908. An AND gate 917 determines whether the masked portion is output as a white or black image, and is controlled by a signal BB. When the signal BB is at "1" level, a black image is output, and when the signal BB is at "0" level, a white image is output.

An OR gate 911 is adopted to output image data output from the gates 910 and 917 as an image signal VIDEO. An exclusive OR gate 909 controls white/black inversion of image data, and is controlled by a signal IN. When the signal IN is at "1" level, the exclusive OR gate 909 outputs an original image, and when the signal IN is at "0" level, the OR gate 909 outputs an inverted image. Note that the signals OF, BB, and IN are output from the CPU section 308 in accordance with a mode selected by an operator.

The ST and EN counters 912 and 913 are respectively a start bit counter and an end bit counter for outputting an image to a predetermined area. The CPU section 308 presets count data for enabling/disabling the gates in these counters through the interface. An F/F 914 is an R-S flip-flop which is set in response to the count-up operation of the ST counter 912 and is reset in response to the count-up operation of the EN counter 913.

Figure 6:
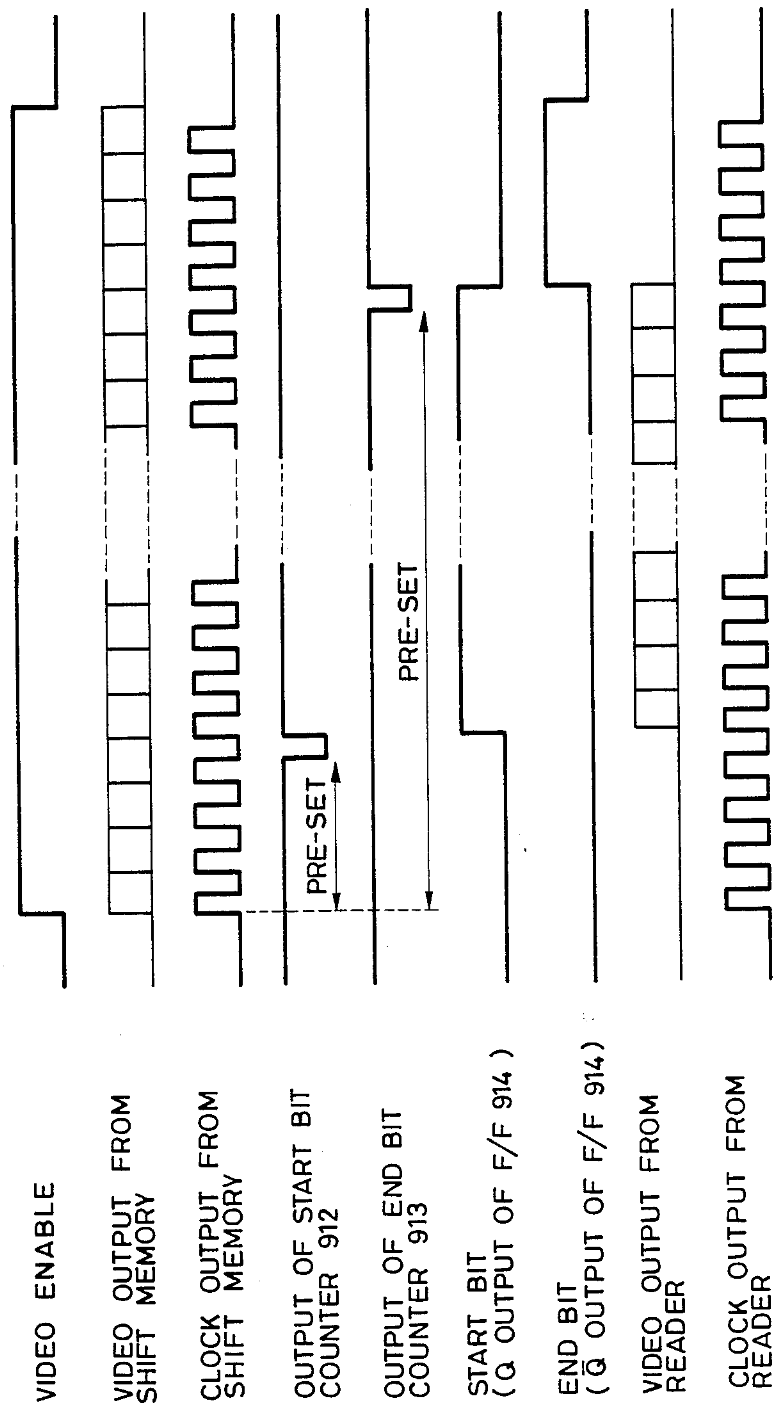
FIG. 6 is a timing chart for explaining operation timings of the respective sections shown in FIG. 5.

FIG. 6 shows operation timings of the respective sections shown in FIG. 5.

For example, when the signal OF is at "1" level, a Q output from the F/F 914 goes to "1" level in response to the count-up operation of the ST counter 912, and the output from the gate 915 goes to "0" level. Then, the gate 910 outputs no data until the EN counter 913 starts the count-up operation, thus masking a corresponding image area. In contrast to this, since the output from the gate 916 is set at "1" level during this interval, if the BB signal is at "1" level, the output from the gate 917 is set at "1" level and the gate 911 outputs data "1", thus black-masking a corresponding image area. On the contrary, if OF=1 and BB=0, a corresponding image area is white-masked.

If OF=0, since the outputs from the gates 915 and 916 respectively go to "1" and "0" levels, an image outside a trimmed range is black-masked for BB=1, or is white-masked for BB=0.

(5) Variable Magnification Mode

The variable magnification mode will be described hereinafter.

The variable magnification in the sub-scan direction can be achieved by varying a scan speed of the optical system. The CPU section 308 calculates a target rotational speed of the DC servo motor M from a magnification designated by an operator using the console unit A-1, and also calculates a PLL frequency corresponding to the calculated speed. Then, the CPU section 308 presets these data in the motor driver 311 shown in FIG. 3 before the scan operation. More specifically, if a convey speed of the recording medium by the printer unit B is constant, e.g., 180 mm/sec, when an image is enlarged twice, the rotational speed of the motor M is determined such that a scan speed of $\frac{1}{2}\times 90$ mm/sec the scan speed of 180 mm/sec in the equal magnification mode is obtained. When the image is reduced to $\frac{1}{2}$the rotational speed of the motor M is determined such that a speed of 360 mm/sec twice the speed in the equal magnification mode is obtained.

The variable magnification mode in the main scan direction will be described with reference to FIGS. 7A to 7D.

The variable magnification mode in the main scan direction can be achieved by sampling an A/D-converted serial signal from the CCD reader section 301, which is output at a constant frequency, at a clock rate corresponding to a magnification as follows.

Figure 7A:
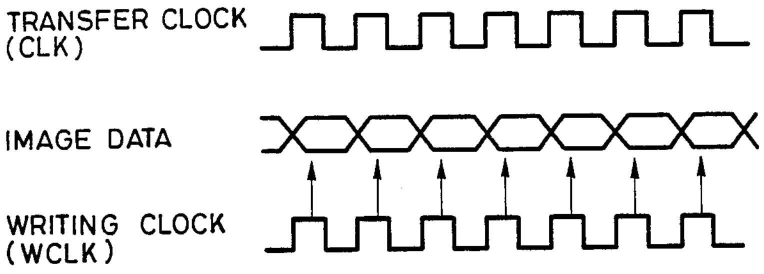
FIGS. 7A to 7D are waveform charts for explaining a variable magnification mode in a main scan direction.
Figure 7B:
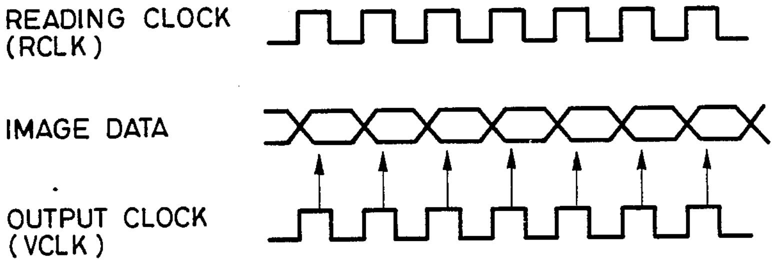

In the equal magnification mode, as shown in FIG. 7A, image data is written in the shift memory section 303 at the writing clock WCLK having a frequency equal to that of a transfer clock CLK from the CCD reader section 301, and as shown in FIG. 7B, image data is read out from the shift memory section 303 at the reading clock RCLK having a frequency equal to that of an output clock VCLK to the printer unit B.

Figure 7C:
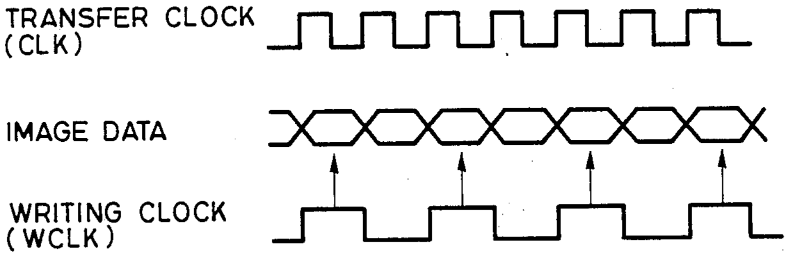

When an image is reduced to $\frac{1}{2}$, the frequency of the writing clock WCLK to the shift memory section 303 is set to be $\frac{1}{2}$ that of the transfer clock CLK, as shown in FIG. 7C, so that one pixel is sampled for each two pixels of an original image. As shown in FIG. 7B, the image data is read out from the shift memory section 303 using the reading clock RCLK having a frequency equal to that of the output clock VCLK, thereby achieving a $\frac{1}{2}$ reduction mode.

Figure 7D:
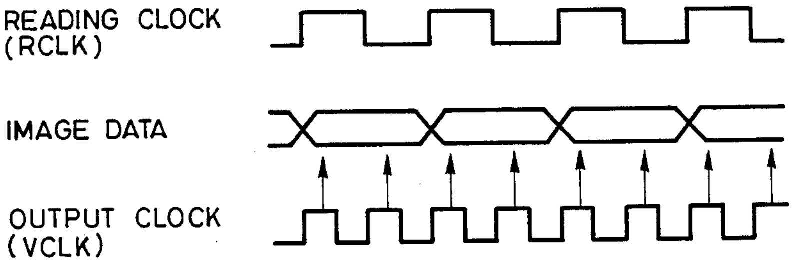

For example, when an image is enlarged twice, the image data is written in the shift memory section 303 in the same manner as in the equal magnification mode, as shown in FIG. 7A, and is read out therefrom using the reading clock RCLK at a clock rate of $\frac{1}{2}$ that of the output clock VCLK to the printer unit B, as shown in FIG. 7D. In this manner, one pixel is added for each pixel of original image data, thus achieving a twice enlargement mode. The technique associated with the variable magnification mode is disclosed in detail U.S. Pat. No. 4,679,096 (Canon).

(6) Image Shift Mode

An image shift mode will be described with reference to FIGS. 8 and 9.

Figure 8:
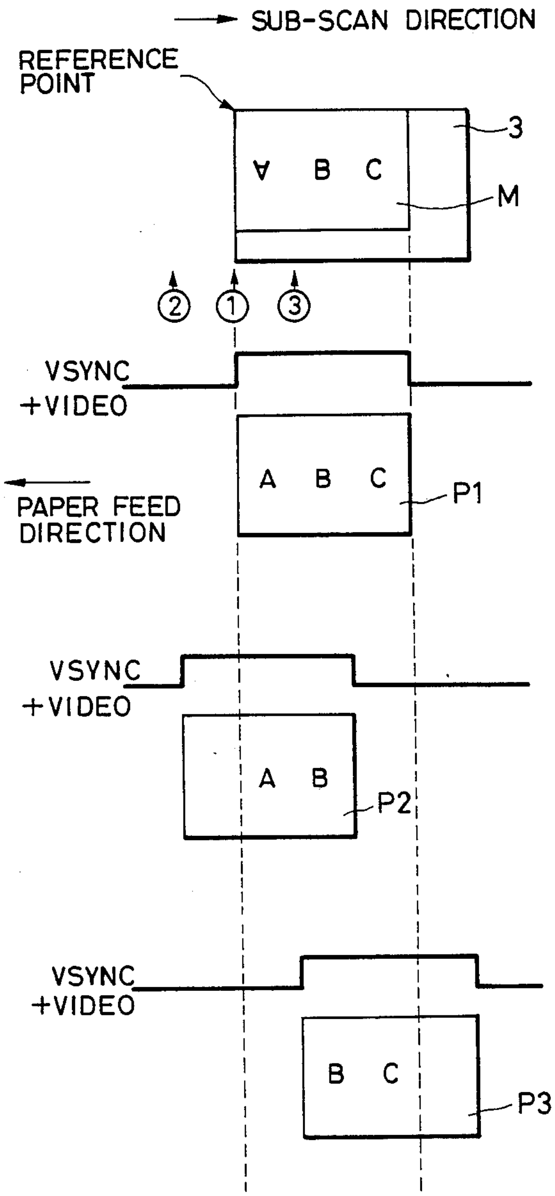
FIGS. 8 and 9A to 9C are views for explaining an image shift mode.

In the sub-scan direction, as shown in FIG. 8, the image shift mode can be achieved by changing an original image scan operation and an output timing of the image sub-scan period signal VSYNC output to the printer unit B.

If the image signal VIDEO is output together with the signal SYNC when the optical system has reached a position ① with respect to an original document M, a non-shift recording output P1 is obtained. If the image signal VIDEO is output together with the signal VSYNC when the optical system has reached a position ②, a backward-shifted recording output P2 is obtained. If the signal VSYNC and the image signal VIDEO are output when the optical system has reached a position ③, a forward-shifted recording output P3 is obtained.

Figures 9A, 9B, 9C:
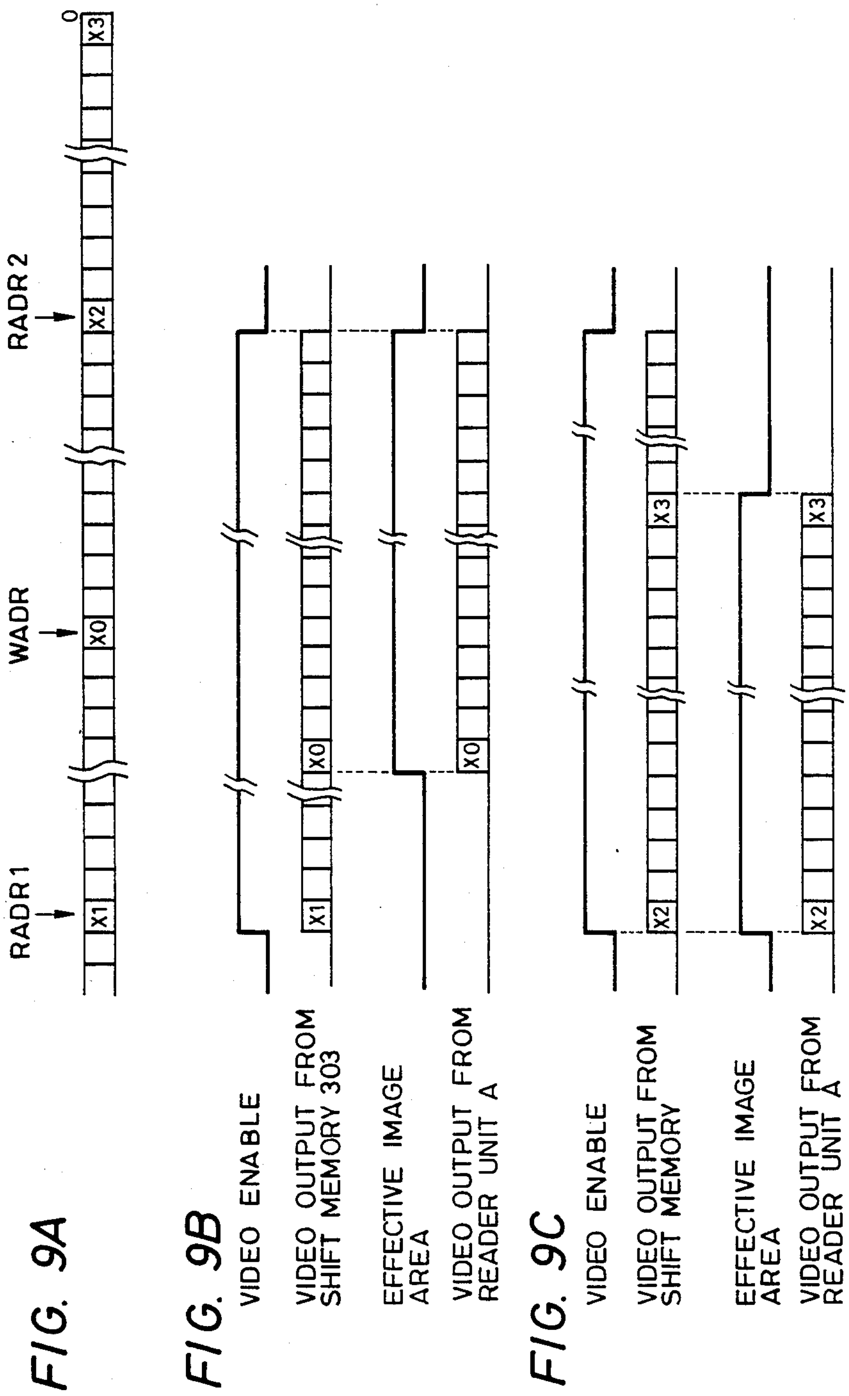

As shown in FIG. 9A, a image shift operation in the main scan direction can be achieved by relatively changing count-down start addresses supplied to the write and read address counters 904 and 905 through the I/O registers 902 and 903 shown in FIG. 5.

For example, if a read start address is given as RADR1 with respect to a write start address WADR to the shift memory section 303, image data $X_0$ corresponding to the address WADR is shifted to the right with respect to an output VIDEO ENABLE corresponding to a width of an image in the main scan direction, as can be seen from FIG. 9B. More specifically, no image data is present between image data $X_1$ corresponding to the read start address RADR1 and the image data $X_0$ in practice. If a read start address is given as RADR2, data $X_3$ corresponding to a shift memory address "0" is shifted to the left with respect to the output VIDEO ENABLE, as can be seen from FIG. 9C. Note that an effective image period signal in FIG. 9C is a trimming period signal formed by the ST counter 912, the EN counter 913, the F/F 914, the gates 915, 916, 917, 910, and 911, and is necessary for setting an ineffective image outside a period between the address "0" in the shift memory section 303 and the address WADR in FIG. 9A to be a white signal.

(7) Interface Signal

A timing of an interface signal exchanged between the reader unit A and the printer unit B will be described with reference to FIGS. 10 and 11.

A BEAM DETECT signal BD is used for synchronizing an image signal with rotation of the polygonal scanner for scanning the polygonal mirror arranged in the laser scan optical system 25 of the printer unit B. The signal BD corresponds to a leading end signal of each scan line. More specifically, the BEAM DETECT signal BD is a horizontal sync signal indicating a scan position of the beam.

In the image signal VIDEO, one pixel has a pulse width of about 56 ns, and 4678 bits are output per line. When the reader unit A is connected to the printer unit B, the image signal VIDEO is synchronized with the signal BD. When the image signal VIDEO is transmitted to other units, it is output in synchronism with an internal pseudo horizontal sync signal (to be referred to as a signal HSYNC hereinafter). The period signal VIDEO ENABLE indicates a period during which 4678 image data are output, and is output in synchronism with the signal BD or HSYNC.

The signal VSYNC indicates a period of an image in the sub-scan direction.

A PRINT REQUEST signal indicates a paper feed enable state in the printer unit B The reader unit A outputs a paper feed command using a PRINT signal in response to the PRINT REQUEST signal. When time T1 concerning a magnification corresponding to a copying mode set by an operator, trimming area, and a shift amount has elapsed, the reader unit A outputs the image signal VIDEO together with the signal VSYNC.

Signals OHP and VTOP are input from the sensors 313 and 314 (FIG. 3) indicating the position of the optical system of the leader unit A. Backward and forward movement control signals BACK and FORWARD are supplied from the CPU section 308 shown in FIG. 3 to the optical system driving motor driver 311.

Figure 11:
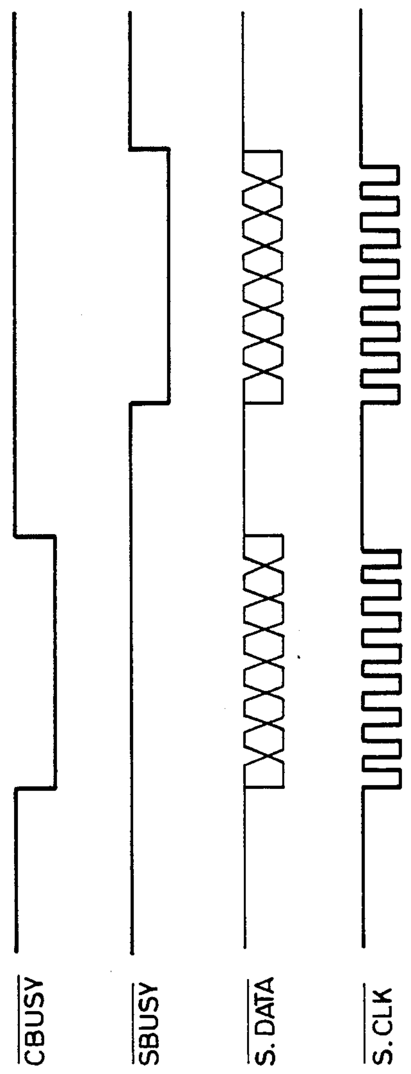

In FIG. 11, signal lines $\overline{\text{S.DATA}}$, $\overline{\text{S.CLK}}$, C.BUSY, and $\overline{\text{S.BUSY}}$ are used for data communication between the reader unit A and the printer unit B. The signal lines $\overline{\text{S.DATA}}$ and $\overline{\text{S.CLK}}$ are used for 8-bit serial data and clocks, and are bidirectional lines. The signal line C.BUSY is enabled when the reader unit A outputs data and clocks, and the signal line S.BUSY is enabled when the printer B outputs data and clocks.

Figure 10:
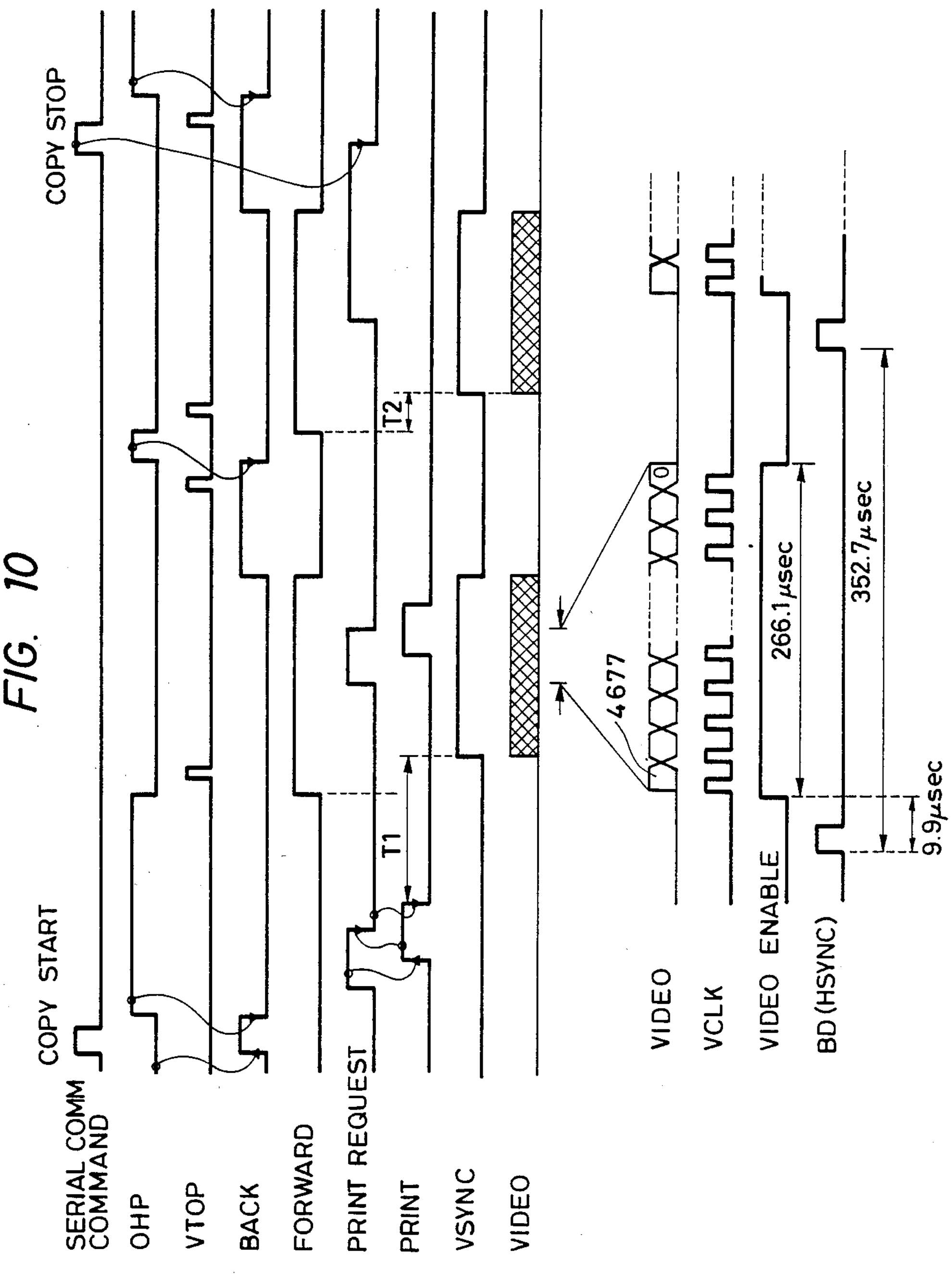
FIGS. 10 and 11 are waveform charts for explaining signal exchange timings between the reader unit A and a printer unit B.

For example, the copy start command or copy stop command from the reader unit A to the printer unit B, as shown in the timing chart of FIG. 10, is subjected to serial communication.

(8) Variable Magnification Function

The copying machine of this embodiment has the seven magnification functions as shown in the Table below.

In the Table, MX indicates a main scan magnification, MY indicates a sub-scan magnification, DX and DY indicate original sizes associated with a read operation, and PX and PY indicate paper sizes of a recording medium on which image data is formed. Suffix X indicates the main scan direction, and suffix Y indicates the sub-scan direction. The original size means an overall original document or a size of an area designated by an operator.

| Magnification Function No. | Indication | Content |
|---|---|---|
| 1 | Equal | MX = MY = 100% |
| 2 | Zoom | MX = MY ≢ 100% Magnification designated by operator |
| 3 | XY Zoom | MX, MY Magnifications independently designated by operator |
| 4 | Auto | MX = MY = min(PX/DX, PY/DY) Magnification automatically set |
| 5 | XY Auto | MX = PX/DX, MY = PY/DY Magnification automatically set |
| 6 | X Zoom, Y Auto | MX: Magnification set by operator MY = PY/DY: Magnification automatically set |
| 7 | X Auto, Y Zoom | MX = PX/DX: Magnification automatically set MY = Magnification set by operator |

The variable magnification function Nos. 1 and 4 are repeatedly selected by the key 127 shown in FIG. 2B.

The variable magnification function No. 2 is set by the keys 128 and 129. In the variable magnification function No. 3, the sub-scan magnification MY is set by the keys 131 and 132, and the main scan magnification MX is set by the keys 134 and 135. In the variable magnification function No. 5, MY is set in the auto variable magnification mode by the key 130, and MX is set in the auto variable magnification mode by the key 133. In the variable magnification function No. 6, MY is set in the auto variable magnification mode by the key 130, and MX is selected to have a desired magnification by the keys 134 and 135. In contrast to this, in the variable magnification function No. 7, MX is set in the auto variable magnification mode by the key 133, and MY is selected to have a desired magnification by the keys 131 and 132.

FIG. 12 shows display contents of the displays 125 and 126 when the above seven functions are selected. All the numerical values are indicated in units of %. "A" means "auto", and "°" and "--" displayed on the left of "A" respectively indicate that magnifications are independently set in the main scan and sub-scan directions.

An auto variable magnification calculation mode will be described. Basically, the main scan magnification MX is given by PX/DX (i.e., the main scan length PX of a paper sheet is divided by the main scan length DX of an original document), and the sub-scan magnification MY is similarly given by PY/DY. MX and MY obtained in this manner are not always equal to each other. Values of MX and MY in the variable magnification function Nos. 5 to 7 can be used without any modification. However, in the variable magnification function No. 4, MX and MY must always be equal to each other. In this case, either PX/DX or PY/DY, e.g., smaller one, is used as MX and MY. A copying magnification selected in this embodiment falls within the range of 35% to 400%. When the calculation result falls outside this range, it is forcibly set to be 35% or 400%.

The copying machine of this embodiment first employs the variable magnification functions Nos. 6 and 7. More specifically, in the conventional copying machine, the auto variable magnification mode means that magnifications are automatically set in both the main scan and sub-scan directions. For this reason, one of the main scan and sub-scan magnifications cannot be set to be a desired magnification by an operator. In this embodiment, an operator can desirably set one of these magnifications, thus widening an application range of the variable magnification functions.

Figure 13:
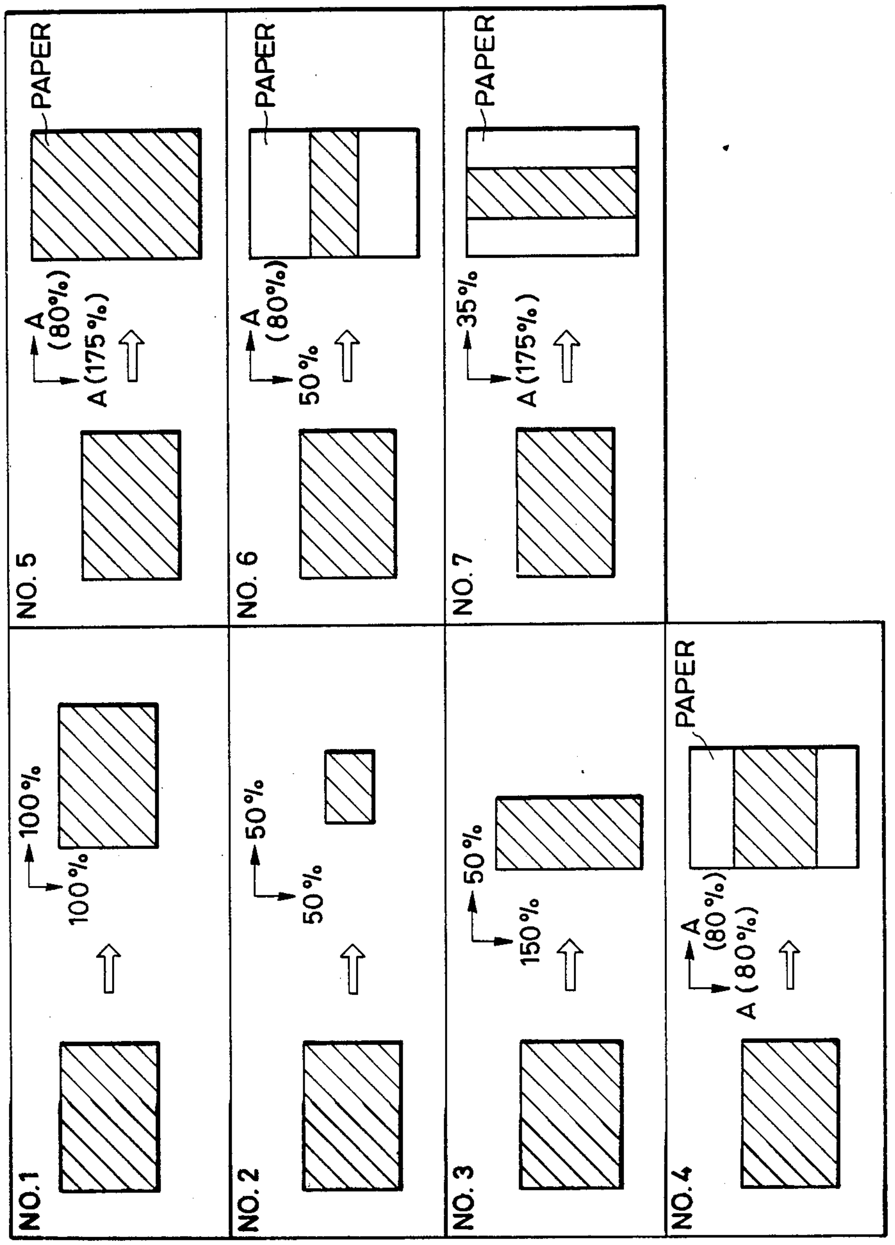
FIG. 13 is a view for explaining a detailed variable magnification function of this embodiment.

FIG. 13 shows examples of the above seven variable magnification functions. A hatched portion on the left side of each arrow in FIG. 13 indicates an original document, and another hatched portion on the right side of the arrow indicates an image subjected to the variable magnification function.

The automatic variable magnification functions are illustrated together with the paper sizes. Magnifications are indicated in both the main scan and sub-scan directions, "A" means "auto", and numerals in parentheses are calculated auto variable magnifications.

(9) Paper Size Selecting Function

As an automatic function associated with an original size, this embodiment employs an auto paper size selecting function. In this function, an optimum paper sheet is selected in order to obtain an image output having a size obtained by multiplying a detected original size or a designated area size with a preset magnification. Conditions for selecting the paper sheet require detections of an original size and a magnification. In the conventional copying machine, both the auto variable magnification function and the auto paper size selecting function cannot be selected at the same time, as described above. Therefore, if the auto variable magnification function is selected when the auto paper size selecting function has already been selected or vice versa, an alarm message is displayed, thereby informing to an operator that both the functions cannot be used at the same time or the secondary selected function is set and the already selected function is forcibly canceled against an operator's will. Therefore, for an operator, there are a lot of limitations in use, and a selected mode is sometimes undesirably canceled, resulting in poor operability.

In this embodiment, the above-mentioned four auto variable magnification functions (Nos. 4 to 7) and the auto paper size selecting function can be used at the same time.

In the basic principle of magnification determination and paper size selection when the auto variable magnification mode and the auto paper size selecting functions are used at the same time, magnifications are calculated for paper sizes set in the paper feed cassettes when a detected original size or a designated area size is subjected to auto variable magnification mode, and a paper size with which the calculated magnification is closer to 100% is selected.

Accordingly, a copying operation at an equal magnification which is most frequently used in the copying machine can be executed without contradiction, and this results in convenience. In addition, since neither limitations in use nor unnecessary messages are given to an operator, he will not be confused.

When the auto variable magnification function and the auto paper size selecting function are simultaneously selected, the variable magnification can be automatically selected to be 100%.

(10) Copy Sequence

Figure 14:
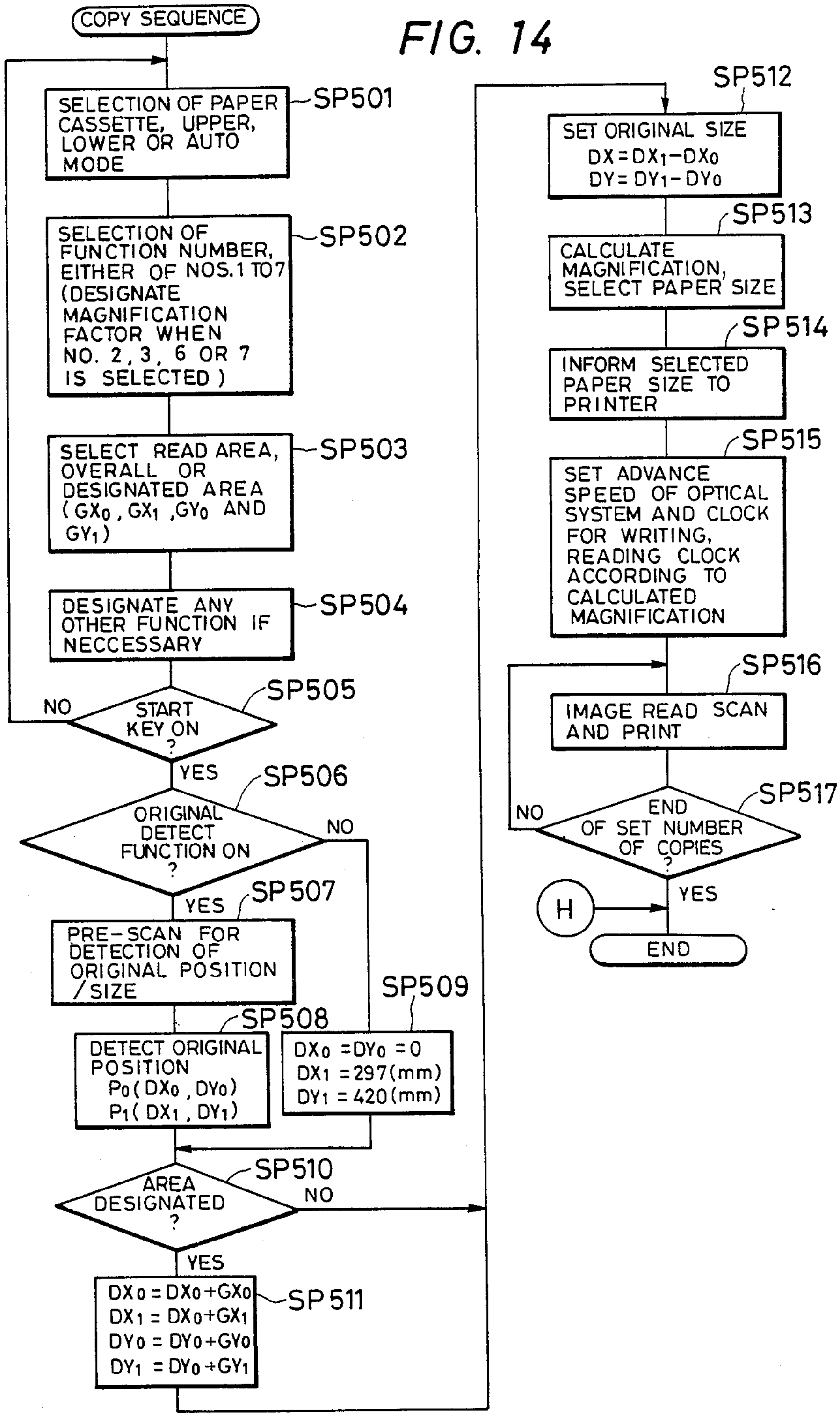
FIG. 14 is a flow chart showing a copying process sequence of this embodiment.

FIG. 14 shows a copy sequence of this embodiment. This sequence is stored in the ROM of the CPU section 308, and is executed by the CPU.

First, an operator selects, using the key 116, an upper cassette as a paper feed cassette position or a mode for automatically selecting the paper feed cassette position (SP501). The operator then selects one of the seven variable magnification functions using the keys 127 to 129, 130 to 132, and 133 to 135, and designates a desired magnification as needed (SP502).

The operator selects an overall original document area or a specific or designated area as a read area in accordance with the sequence shown in FIGS. 16A to 16G. When the operator selects the specific area as the read area, he sets coordinates of the specific area in areas GX0, GY0, GX1, and GY1 provided in the RAM in the CPU section 308 (SP503). The operator also sets other functions, if necessary (SP504). Note that the designation method of an original area shown in FIGS. 16A to 16G will be described later in detail.

When the copy start key 100 is depressed (SP505), the copying operation is started. If it is determined that an original detect function is selected (SP506), the pre-scan operation is performed in order to detect an original position size as described above (SP507), and original coordinate positions are set in areas DX0, DY0, DX1, and DY1 provided in the RAM (SP508). However, if it is determined that the original detect function is not selected (SP506), corresponding values are set assuming a maximum read area A3 size or an equivalent (SP509).

If it is determined that the specific area is designated in step SP503 (SP510), origins DX0 and DY0 of the detected original are added to the areas GX0, GX1, GY0, and GY1, and the results area again set in the areas DX0, DX1, DY0, and DY1 (SP511). At this time, the read area coordinates are set in the areas DX0, DX1, DY0, and DY1 regardless of presence/absence of detection or designation of a specific area.

Then, the sizes DX and DY of the original document, i.e., the read area, are respectively calculated by DX=DX1−DX0 and DY=DY1−DY0, and are set in the areas in the RAM (SP512).

In accordance with the designated mode, if the auto variable magnification mode is selected, magnification are calculated, and if the auto paper size selecting mode is selected, the paper feed cassette position is selected (SP513). This operation will be described later in detail with reference to FIGS. 15A to 15D.

Then, the paper feed cassette position selected in step SP513 is instructed to the printer unit B (SP514). In accordance with the magnifications calculated in SP513, the scan speed of the optical system in the sub-scan direction, the frequency of the writing clock to the shift memory section 303, and the frequency of the reading clocks from the shift memory section 303 are set (SP515). Thereafter, the image read scan operation and the print operation are repeated until the copy sequences corresponding to the set number of copies are completed, and the operation is then ended (SP516 and SP517).

Calculation of the magnification and selection of the paper size (SP513) will be described in detail with reference to FIGS. 15A to 15D.

First, it is determined if the auto paper size selecting function is selected (SP601). If NO in step SP601, the paper size already selected by the operator is set in the areas PX and PY in the RAM in the CPU section 308 (SP602), and magnifications are calculated as follows in accordance with PX and PY and the already set original read area sizes DX and DY in accordance with the selected variable magnificattin function (SP603).

If the variable magnification function Nos. 1 to 3 are selected, since the main scan and sub-scan magnifications MX and MY are known (designated by the operator), this sequence is ended without calculations.

If the function No. 4, i.e., the auto variable magnification function is selected, MX and MY which can yield MX=MY=max(0.35, min (PX/DX, PY/DY, 4.0)) are calculated, and are set in the areas in the RAM. In this operation, magnifications for reducing/enlarging a read area onto the overall surface of a paper sheet are independently calculated in both the main scan and the sub-scan directions, and thereafter, the smaller one is adopted. In addition, the variable magnification range is set to fall within the range of 35% to 400% (SP604)

If the function No. 5, i.e., the main scan and sub-scan auto variable magnification function is selected, since the magnifications in the main scan and sub-scan directions can be different from each other unlike the auto variable magnification function No. 4, MX and MY are respectively calculated by MX=max(0.35, min (PX/DX, 4.0)) and MY=max(0.35, min (PY/DY, 4.0)) (SP605).

In the function No. 6, since MX has already been set, only MY is calculated in the same manner as in the function No. 5 (SP606). In the function No. 7, since MY has already been set, only MX is similarly calculated as described above (SP607).

If it is determined in step SP601 that the auto paper size selecting function is selected, the paper size of the upper cassette is set in areas PXU and PYU in the RAM, and the paper size of the lower cassette is set in areas PXL and PYL (SP608).

Figure 15A:
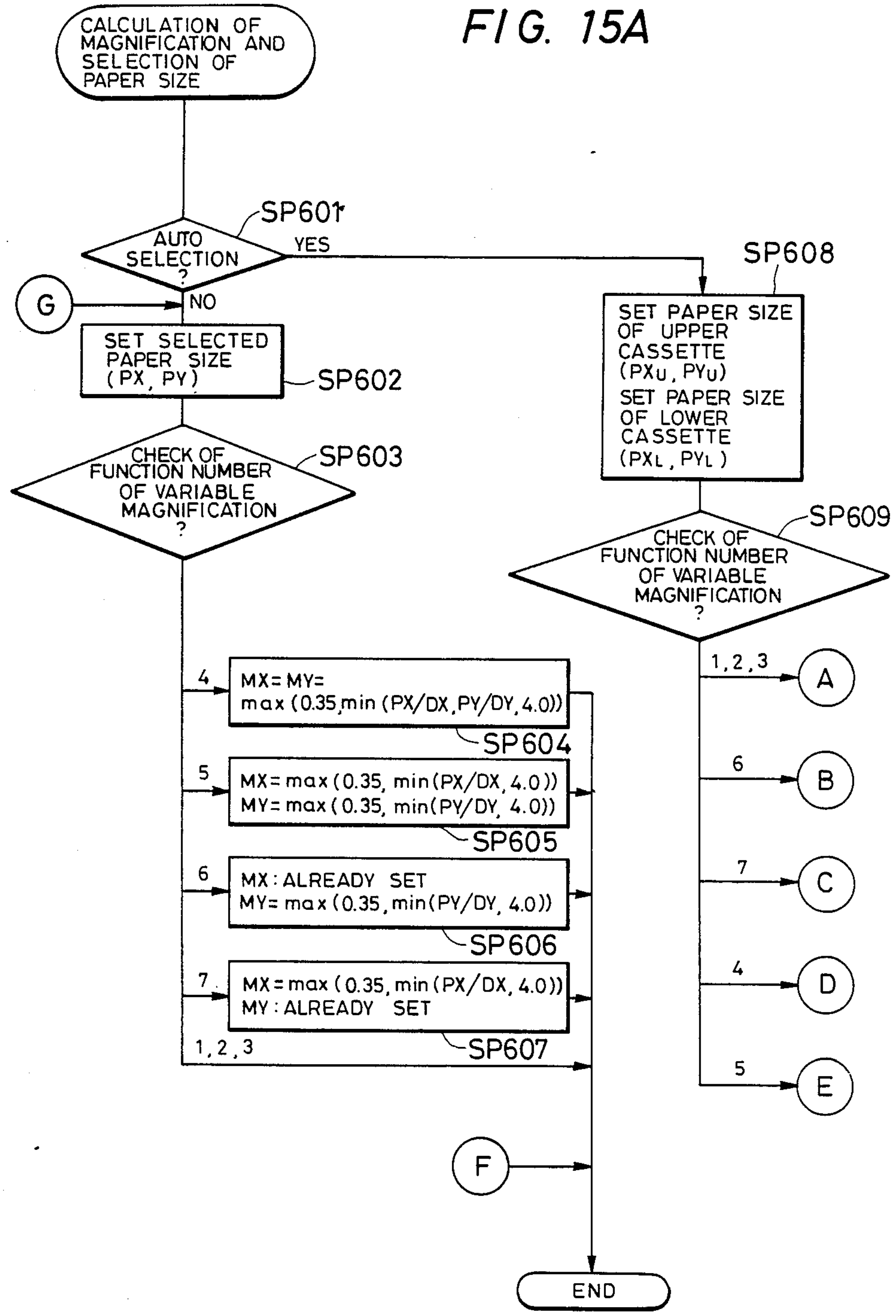
FIGS. 15A to 15D are flow charts showing detailed sequences of magnification calculation and paper size selection modes in the sequence shown in FIG. 14.
Figure 15B:
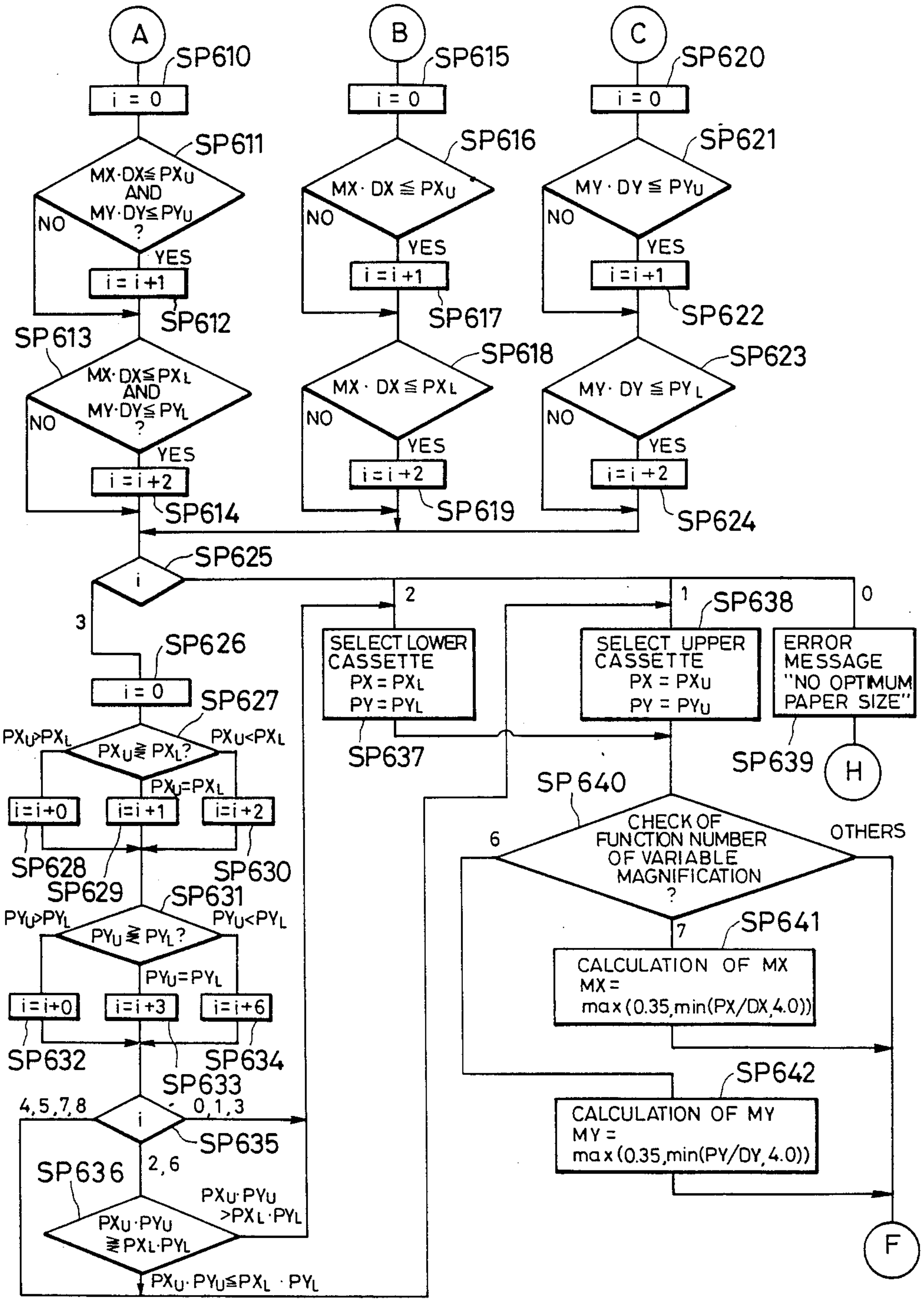
Figure 15C:
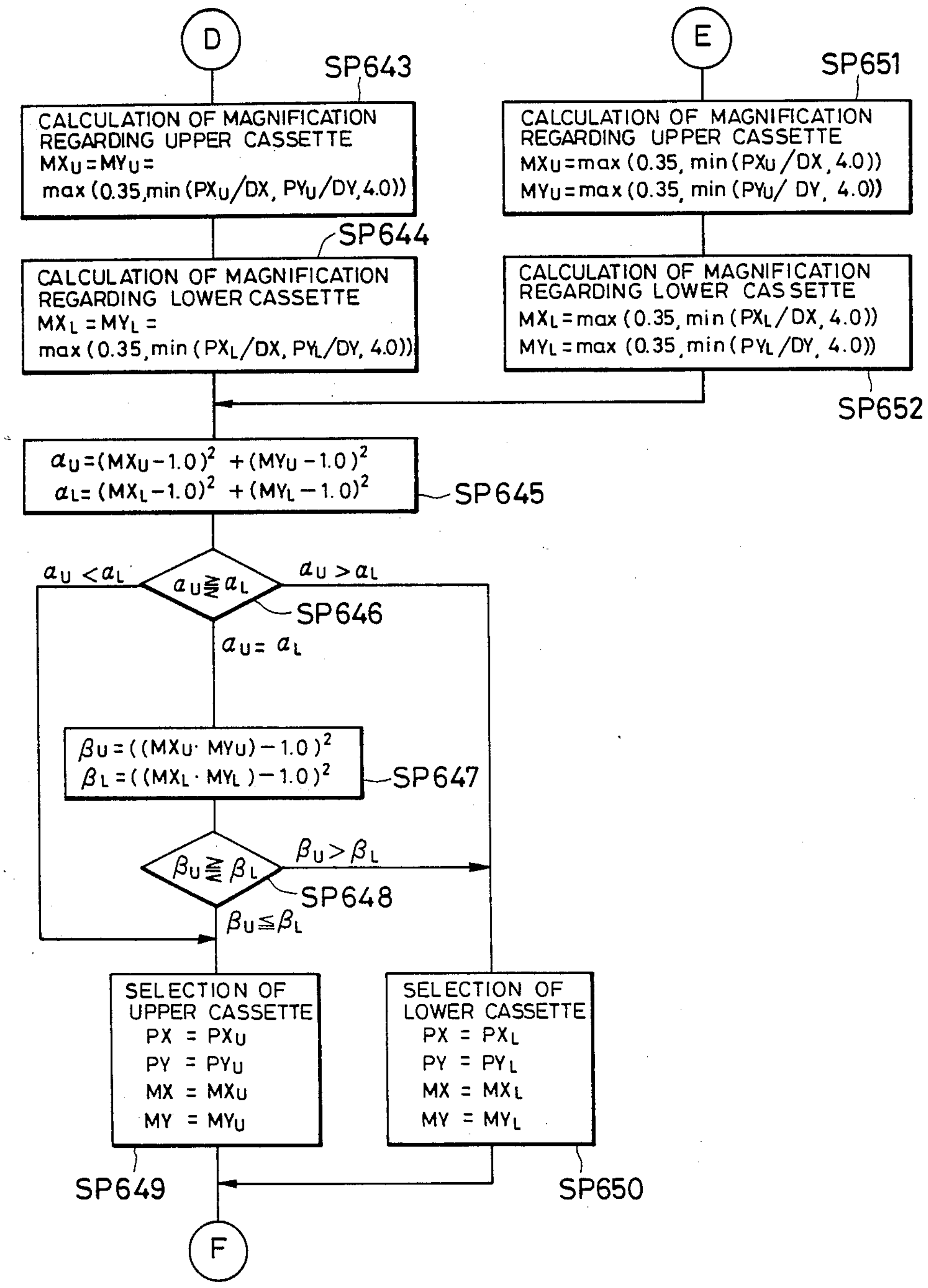

Next, the variable magnification function No. is checked (SP609), and processing shown in FIG. 15B or 15C is executed. In FIG. 15B, i is a control variable for selecting the paper cassette.

If the function No. 1, 2 or 3 is selected, both MX and MY areas have already been set. Therefore, it is checked if sizes obtained by multiplying the magnifications MX and MY with the read area sizes DX and DY are smaller than the paper size of the upper cassette in both the main scan and sub-scan directions (SP611), and checking is similarly performed for the lower cassette (SP613). If it is determined that the calculated paper sizes correspond to paper sheets in neither the upper nor lower cassettes (SP625), a message indicating that no optimum paper sheet is found is informed to the operator, and the flow returns to Ⓗ FIG. 15. Then, the sequence is ended without performing the copying operation (SP639).

If the image can be formed on a paper sheet in either the upper or lower cassette (SP625), the corresponding paper feed cassette position is selected, and the paper size is set in the areas PX and PY in the RAM(SP637 and SP638).

If the image can be formed on both paper sheets in both the upper and lower cassettes (i=3), the sizes of the paper sheets in the upper and lower cassettes are compared. If one sheet is smaller than the other sheet in both the main scan and sub-scan directions, the smaller sheet is selected. If both the sheets have the same size, the upper cassette position is selected in this embodiment (SP626 to SP635). If the sheets have different size relationships in the main scan and sub-scan directions, a sheet having a smaller area is selected (SP636).

If it is determined in step SP609 that the variable magnification function No. 6 or 7 is selected, since one of MX and MY has already been set, the paper sizes of the upper and lower cassettes are compared with an image size in a direction, the magnificaiton of which has already been known (SP616, SP618, SP621, and SP623), and a paper sheet is designated accordingly (SP615 and subsequent steps). The sequence therefor is the same as the function Nos. 1 to 3. However, since MY in the function No. 6 or MX in the function No. 7 has already been set, after the paper size is determined (SP637 and SP638), magnifications are calculated on the basis of the paper size and the read size (SP641 and SP642).

If it is determined in step SP609 that the variable magnification function No. 4 or 5 is selected, a variable magnification for reducing or enlarging a read area onto the overall surface of a paper sheet are calculated for both the upper and lower cassettes (SP643, SP644, SP651, and SP652 in FIG. 15C). As a result, magnifications MXU and MYU for forming an image on the overall surface of a paper sheet in the upper cassette and magnifications MXL and MYL for forming an image on the overall surface of a paper sheet of the lower cassette are set in the areas in the RAM in the CPU section 308.

An approximate paper size is determined from these MXU, MYU, MXL, and MYL on the basis of a proper rule. In this embodiment, in the rule, a paper size having a smaller square sum of an error with a magnification in length, i.e., smaller $\alpha=(MX-1.0)^2+(MY-1.0)^2$, is selected, (SP645 and SP646) If the square sums of both the paper sheets are equal to each other, a paper sheet having smaller square of an error with an equal magnification in an area, i.e., smaller $\beta=(MX\cdot MY\ 1.0)^2$, is selected (SP647 and SP648).

As a result, the selected paper size PX, PY and the corresponding magnifications MX and MY are set in the areas in the RAM (SP649 and SP650), and calculation of the magnifications and selection of the paper size are ended.

Figure 15D:
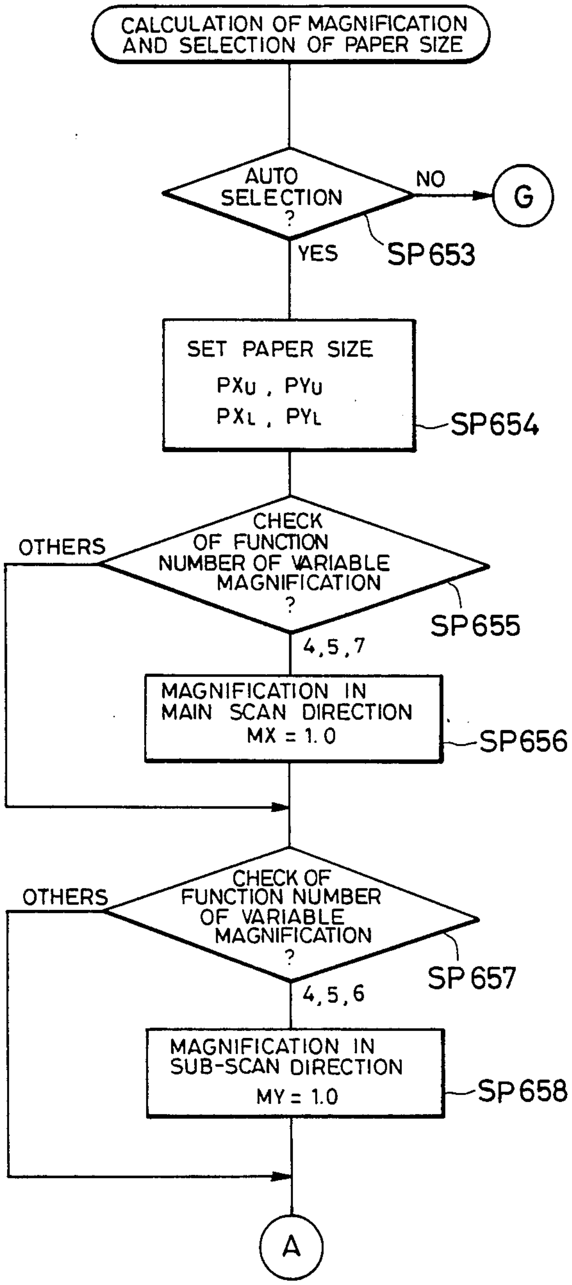

In calculation of the magnifications and selection of the paper size, when the auto variable magnification function and the auto paper size selecting function are simultaneously selected as shown in FIG. 15D, a magnification subjected to the auto variable magnification function can be forcibly set to be 100% (SP653 to SP658), resulting in convenience.

(11) Designation of Read Area

FIGS. 16A to 16G show operation sequences for designating a specific area as a read area using the liquid crystal display 13 and one of the soft keys 124 (FIG. 2B).

When the copying machine is powered, the overall original is automatically selected as a read area, as indicated by a display shown in FIG. 16A. In this case, when a soft key SK6 corresponding to "ETC" is depressed, selection of other functions, e.g., a shift function, is enabled. If either of soft keys SK1, SK2, and SK3 is depressed, a display shown in FIG. 16B is made, and designation of the read area is requested to the operator.

When the copying machine is kept in this state for a predetermined period of time, a display shown in FIG. 16C is made, and selection of the overall original or specific area designation is requested to the operator. If the operator depresses the soft key SK1 or SK2, a display state shown in FIG. 16A is resumed; if he depresses the soft key SK4 or SK5, a display shown in FIG. 16D is made.

In the display state shown in FIG. 16D, the specific area can be input in mm in both the main scan direciton (x) and the sub-scan direction (y) using ten keys 103. In this state, three cursors corresponding to the soft key SK1 first flicker. If the operator sequentially inputs "1", "0", and "0" using the ten keys and then depresses the "*" key, the display state is switched to a display shown in FIG. 16E, and cursors corresponding to the soft key SK2 flicker After the area is input similarly, a display shown in FIG. 16F is made. After all the four coordinates are input, a message "OK" is displayed. If the soft key SK5 is then depressed, the setting operation of the specific read area is ended, and a display shown in FIG. 16G is made, thus displaying the designated area. In this state, if any of the soft keys SK1, SK2, SK3, SK4, and SK5 is depressed, the display shown in FIG. 16B is again performed.

In this example, GX0=100, GX1=200, BY0=50, and GY1=300 in step SP503 in the copy sequence shown in FIG. 15.

The read area will be described with reference to FIGS. 17A to 17C.

Figure 16:
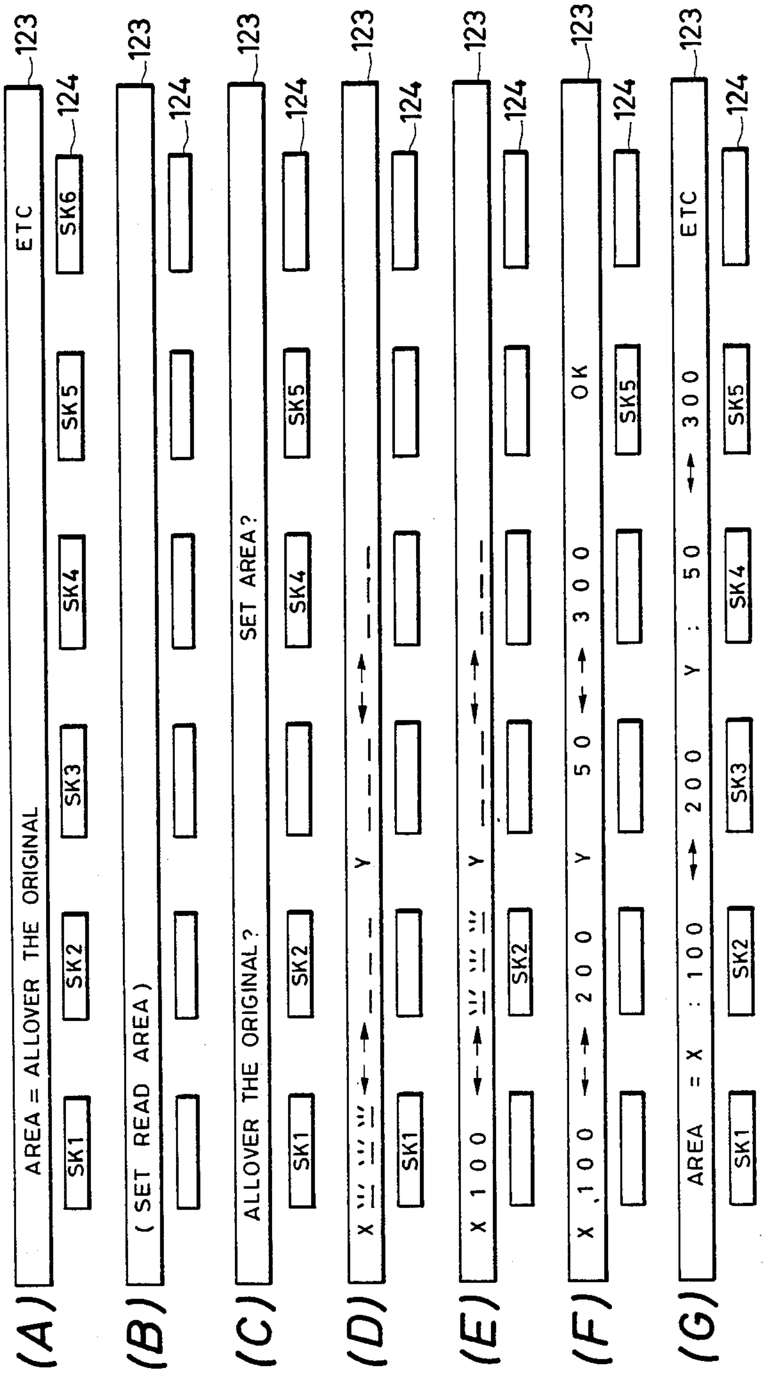
FIGS. 16A to 16G are views for explaining a setting operation of a read area of an original image.
Figure 17A:
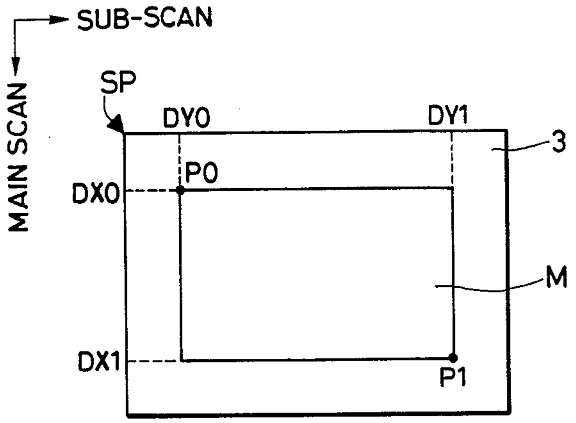
FIGS. 17A to 17C are views for explaining a read area on an original image.

FIG. 17A shows a state of the original document M placed on the original table glass 3. As a result of detection by means of pre-scan operation, coordinates of a point closest to an original reference point and of a point farthest therefrom are respectively P0 (DX0, DY0) and P1 (DX1, DY1). If the overall original is set to be a read area by the setting operation shown in FIG. 16, DX0, DX1, DY0, and DY1 shown in FIG. 17A are set to define a read area.

Figure 17B:
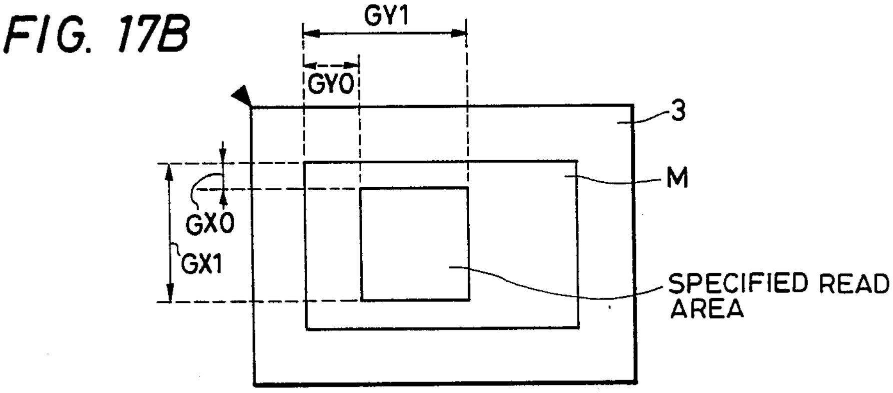
Figure 17C:
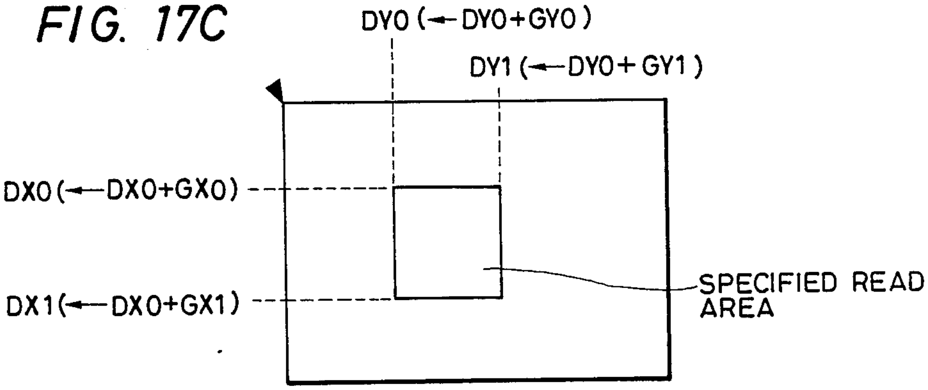

If a specific area defined by GX0, GX1, GY0, and GY1 is set in accordance with the sequence shown in FIG. 16, these area coordinates correspond to an original document, as shown in FIG. 17B. Therefore, a read area to be finally set on the glass 3 is obtained by offsetting the origin coordinates of the detected original to the specific area, as shown in FIG. 17C.

According to the above embodiment, when the auto variable magnification function and the auto paper size selecting function are simultaneously selected, since the magnifications and the paper size can be appropriately selected, a copying machine with high operability can be provided.

In addition, a function for reducing or enlarging an original image in one of the main scan and sub-scan directions at a magnification set by the operator and automatically reducing or enlarging it in the other of the main scan and sub-scan directions can be provided.

The present invention is not limited to the above embodiment, and various changes and modifications may be made within the spirit and scope of the appended claims.

I claim:

1. An image forming apparatus comprising:

original size input means for inputting an original size;

sheet size input means for inputting a sheet size;

determination means for determining a first variable magnification in a first direction of a reproduced image on the basis of both the original size input through said original size input means and the sheet size input through said sheet size input means;

magnification input means for arbitrarily inputting a second variable magnification in a second direction different from the first direction of the reproduced image; and reproduced image forming means for forming a reproduced image at mutually different variable magnifications relating to the first and second directions on the basis of the first variable magnification determined through said determination means and the second variable magnification arbitrarily input through said magnification input means;

2. An apparatus according to claim 1, wherein said determination means has a first determination mode for determining a variable magnification on the basis of widths in a first direction of the original and the sheet.

3. An apparatus according to claim 2, wherein said determination means has a second determination mode for determining a variable magnification on the basis of widths in a second direction of the original and the sheet, the second direction being different from the first direction, and wherein said apparatus further comprises selection means for arbitrarily selecting the first or second determination mode.

4. An apparatus according to claim 1, wherein said forming means includes reader means adapted to scan the original and output an image signal, and to perform a variable magnification operation by changing a sampling rate of the image signal with regard to the first direction and by changing an original scanning speed with regard to the second direction.

5. An apparatus according to claim 1, wherein said magnification input means is capable of arbitrarily inputting the first and second magnifications relating to the respective first and second directions of the reproduced image.

6. An image forming apparatus comprising:
original size input means for inputting an original size;
sheet size input means for inputting a sheet size;
selection means for selecting an automatic mode for automatically determining a first variable magnification in a first direction of a reproduced image on the basis of both an original size input through said original size input means and a sheet size input through said sheet size input means;
mode display means for displaying the automatic mode selected through said selection means; and
magnification input means for arbitrarily inputting a second variable magnification in a second direction different from the first direction of the reproduced image;
wherein said mode display means displays a magnification arbitrarily input through said magnification input means as well as the automatic mode.

7. An apparatus according to claim 6, wherein said selection means has first and second selection keys for selecting first and second determination modes, respectively, said first determination mode being for automatically determining a variable magnification on the basis of widths in a first direction of the original and the sheet, said second mode being for automatically determining a variable magnification on the basis of widths in a second direction of the original and the sheet, the second direction being different from the first direction.

8. An apparatus according to claim 6 wherein said magnification input means is capable of arbitrarily inputting the first and second magnifications relating to the respective first and second directions of the reproduced image.

9. An apparatus according to claim 6, wherein said display means is capable of displaying a numeral indicative of an input magnification.

* * * * *

UNITED STATES PATENT AND TRADEMARK OFFICE
CERTIFICATE OF CORRECTION

PATENT NO. : 4,847,662

DATED : July 11, 1989

INVENTOR(S) : MASANORI YAMADA

It is certified that error appears in the above-identified patent and that said Letters Patent is hereby corrected as shown below:

AT [57] ABSTRACT

Line 10, "preforming" should read --performing--.

COLUMN 1

Line 28, "still high" should read --still higher--.
Line 37, "a" should be deleted.

COLUMN 2

Line 57, "4678(=(297/25.4)'400)." should read --4678(=(297/25.4)x400).--.
Line 60, "(=(106/180)x(25.4/400))." should read --(=($10^6$/180)x(25.4/400)).--.

COLUMN 3

Line 22, "a" (second occurrence) should read --an--.

COLUMN 6

Line 21, "$P_3(X_3,Y_3)$" should read --$P_3(X_3,Y_3)$.--.
Line 47, "$P_2(X_2,Y_2)$" should read --$P_2(X_2,Y_2)$.--.
Line 55, "$P_4(X_4,Y_4)$" should read --$P_4(X_4,Y_4)$.--.

COLUMN 8

Line 27, "½the" should read --½, the--.

UNITED STATES PATENT AND TRADEMARK OFFICE

CERTIFICATE OF CORRECTION

PATENT NO. : 4,847,662

DATED : July 11, 1989

INVENTOR(S) : MASANORI YAMADA

It is certified that error appears in the above-identified patent and that said Letters Patent is hereby corrected as shown below:

COLUMN 10

Line 10, "trimming" should read --a trimming--.
Line 19, "C.BUSY," should read --$\overline{\text{C.BUSY}}$,--.
Line 24, "C.BUSY" should read --$\overline{\text{C.BUSY}}$--.
Line 25, "S.BUSY" should read --$\overline{\text{S.BUSY}}$--.
Line 49, "Zoom MX = MY ≠ 100%" should read --Zoom MX = MY ≠ 100%--.

COLUMN 11

Line 20, ""°"" should read "","".
Line 36, "smaller" should read --the smaller--.

COLUMN 12

Line 10, "to" should be deleted.

COLUMN 13

Line 17, "magnification" (second occurrence) should read --magnifications--
Line 44, "magnificattin" should read --magnification--.

COLUMN 14

Line 24, "FIG. 15." should read --in FIG. 15.--.
Line 46, "magnificaiton" should read --magnification--.
Line 58, "are" should read --is--.

UNITED STATES PATENT AND TRADEMARK OFFICE

CERTIFICATE OF CORRECTION

PATENT NO. : 4,847,662

DATED : July 11, 1989

INVENTOR(S) : MASANORI YAMADA

It is certified that error appears in the above-identified patent and that said Letters Patent is hereby corrected as shown below:

COLUMN 15

Line 3, "SP646)" should read --SP646).--.
Line 24, "crystal display 13" should read --crystal display 123--.

COLUMN 18

Line 14, "claim 6" should read --claim 6,--.

Signed and Sealed this

Twelfth Day of March, 1991

Attest:

HARRY F. MANBECK, JR.

*Attesting Officer*

*Commissioner of Patents and Trademarks*